United States Patent
Lawrence

(10) Patent No.: US 11,080,364 B2
(45) Date of Patent: Aug. 3, 2021

(54) COMPUTER ARCHITECTURE FOR PERFORMING ERROR DETECTION AND CORRECTION USING DEMULTIPLEXERS AND MULTIPLEXERS IN A CORRELITHM OBJECT PROCESSING SYSTEM

(71) Applicant: BANK OF AMERICA CORPORATION, Charlotte, NC (US)

(72) Inventor: Patrick N. Lawrence, Plano, TX (US)

(73) Assignee: Bank of America Corporation, Charlotte, NC (US)

( * ) Notice: Subject to any disclaimer, the term of this patent is extended or adjusted under 35 U.S.C. 154(b) by 245 days.

(21) Appl. No.: 16/298,452

(22) Filed: Mar. 11, 2019

(65) Prior Publication Data
US 2020/0293600 A1    Sep. 17, 2020

(51) Int. Cl.
| | |
|---|---|
| *G06F 17/15* | (2006.01) |
| *G06F 9/455* | (2018.01) |
| *G06F 1/03* | (2006.01) |
| *G06F 7/02* | (2006.01) |
| *G06F 40/166* | (2020.01) |
| *G06F 40/205* | (2020.01) |
| *G06F 40/284* | (2020.01) |

(52) U.S. Cl.
CPC .............. *G06F 17/15* (2013.01); *G06F 1/03* (2013.01); *G06F 7/02* (2013.01); *G06F 9/455* (2013.01); *G06F 40/166* (2020.01); *G06F 40/205* (2020.01); *G06F 40/284* (2020.01)

(58) Field of Classification Search
CPC ....................................................... G06F 17/15
See application file for complete search history.

(56) References Cited

U.S. PATENT DOCUMENTS

| | | |
|---|---|---|
| 5,249,274 A | 9/1993 | Sztipanovits et al. |
| 5,946,673 A | 8/1999 | Francone et al. |
| 6,035,057 A | 3/2000 | Hoffman |
| 6,044,366 A | 3/2000 | Graffe et al. |
| 6,167,391 A | 12/2000 | Lawrence |

(Continued)

OTHER PUBLICATIONS

Matzke et al., "Invariant Quantum Ensemble Metrics", 12 pages. (Year: 2005).*

(Continued)

*Primary Examiner* — Chuong D Ngo
(74) *Attorney, Agent, or Firm* — Michael A. Springs

(57) ABSTRACT

A correlithm object processing system includes a reference table that stores a plurality of correlithm objects, a demultiplexer configured to split a particular one of the plurality of correlithm objects into a first portion of the binary string and a second portion of the binary string, and a multiplexer communicatively coupled to the demultiplexer by at least first and second communication channels. The multiplexer receives the first and second portions of the particular correlithm object over the first and second communication channels, respectively, and combines the first and second portions into a received correlithm object. A node communicatively coupled to the multiplexer node determines distances between the received correlithm object and each of the plurality of correlithm objects stored in the reference table, identifies one of the plurality of correlithm objects from the reference table with the shortest distance, and outputs the identified correlithm object.

19 Claims, 11 Drawing Sheets

(56) References Cited

U.S. PATENT DOCUMENTS

| | | |
|---|---|---|
| 6,278,799 B1 | 8/2001 | Hoffman |
| 6,553,365 B1 | 4/2003 | Summerlin et al. |
| 6,941,287 B1 | 9/2005 | Vaidyanathan et al. |
| 6,943,686 B2 | 9/2005 | Allen |
| 6,947,913 B1 | 9/2005 | Lawrence |
| 7,015,835 B2 | 3/2006 | Lawrence et al. |
| 7,031,969 B2 | 4/2006 | Lawrence et al. |
| 7,246,129 B2 | 7/2007 | Lawrence et al. |
| 7,310,622 B2 | 12/2007 | Lawrence et al. |
| 7,349,928 B2 | 3/2008 | Lawrence et al. |
| 7,418,470 B2 | 8/2008 | Howard et al. |
| 7,526,461 B2 | 4/2009 | Srinivasa et al. |
| 7,730,121 B2 | 7/2010 | Howard et al. |
| 7,941,479 B2 | 5/2011 | Howard et al. |
| 8,412,651 B2 | 4/2013 | Paiva et al. |
| 8,521,669 B2 | 8/2013 | Knoblauch |
| 8,762,130 B1 | 6/2014 | Diaconescu et al. |
| 9,286,291 B2 | 3/2016 | Bufe et al. |
| 9,460,075 B2 | 10/2016 | Mungi et al. |
| 9,495,355 B2 | 11/2016 | Mungi et al. |
| 9,720,998 B2 | 8/2017 | Wang et al. |
| 9,721,190 B2 | 8/2017 | Vijayanarasimhan et al. |
| 9,785,983 B2 | 10/2017 | Zhao et al. |
| 10,019,650 B1 | 7/2018 | Lawrence |
| 10,037,478 B1 | 7/2018 | Lawrence |
| 10,049,305 B2 | 8/2018 | Vijayanarasimhan et al. |
| 10,169,329 B2 | 1/2019 | Futrell et al. |
| 2003/0158850 A1 | 8/2003 | Lawrence et al. |
| 2003/0172368 A1 | 9/2003 | Alumbaugh et al. |
| 2004/0044940 A1 | 3/2004 | Lawrence et al. |
| 2015/0149155 A1 | 5/2015 | Zadeh |
| 2017/0161606 A1 | 6/2017 | Duan et al. |
| 2018/0012993 A1 | 1/2018 | Cheng et al. |
| 2018/0157994 A1 | 6/2018 | Levy |

OTHER PUBLICATIONS

Meersman, R. et al., "On the Move to Meaningful Internet Systems 2005: CoopIS, DOA and ODBASE," OTM Confederated International Conferences CoopIS, DOA and ODBASE Oct. 2005 Agia Napa, Cyprus, Proceedings, Part I, Oct. 31-Nov. 4, 2005, pp. 763-779.

Lawrence, P. N., "Correlithm Object Technology," Apr. 2004, 229 pages.

Lawrence, P. N., "Computer Architecture for Maintaining a Distance Metric Across Correlithm Objects in a Correlithm Object Processing System," U.S. Appl. No. 16/298,111, filed Mar. 11, 2019, 77 pages.

Lawrence, P. N., "Computer Architecture for Emulating a Correlithm Objct Processing System with Transparency," U.S. Appl. No. 16/298,266, filed Mar. 11, 2019, 81 pages.

Lawrence, P. N., "Computer Architecture for Performing Error Detection and Correction in a Correlithm Object Processing System," U.S. Appl. No. 16/298,370, filed Mar. 11, 2019, 76 pages.

Lawrence, P. N., "Computer Architecture for Emulating Coding in a Correlithm Object Processing System," U.S. Appl. No. 16/298,580, filed Mar. 11, 2019, 82 pages.

Lawrence, P. N., "Computer Architecture for Emulating a Correlithm Object Processing System Using Mobile Correlithm Object Devices," U.S. Appl. No. 16/298,662, filed Mar. 11, 2019, 78 pages.

Lawrence, P. N., "Computer Architecture for Emulating a Correlithm Object Processing System with Traceability," U.S. Appl. No. 16/298,726, filed Mar. 11, 2019, 79 pages.

* cited by examiner

1008

|     | T11 | T12 | T13 | T14 | T15 | T16 |
|-----|-----|-----|-----|-----|-----|-----|
| C11 | SD  | SD  | SD  | SD  | 0   | SD  |
| C12 | SD  | SD  | SD  | SD  | SD  | 0   |
| C13 | SD  | SD  | SD  | SD  | SD  | SD  |
| C14 | SD  | SD  | SD  | SD  | SD  | SD  |
| C15 | SD  | SD  | SD  | SD  | SD  | SD  |
| C16 | SD  | SD  | SD  | SD  | SD  | SD  |
| C17 | SD  | SD  | SD  | SD  | SD  | SD  |

|     | T11 | T12 | T13 | T14 | T15 | T16 |
|-----|-----|-----|-----|-----|-----|-----|
| C21 | SD  | SD  | SD  | SD  | 0   | SD  |
| C22 | SD  | SD  | SD  | SD  | SD  | SD  |
| C23 | SD  | SD  | SD  | SD  | SD  | SD  |
| C24 | SD  | SD  | SD  | SD  | SD  | SD  |
| C25 | SD  | SD  | SD  | SD  | SD  | SD  |
| C26 | SD  | SD  | SD  | SD  | SD  | SD  |
| C27 | SD  | SD  | SD  | SD  | SD  | SD  |

*FIG. 11B*

COMPUTER ARCHITECTURE FOR PERFORMING ERROR DETECTION AND CORRECTION USING DEMULTIPLEXERS AND MULTIPLEXERS IN A CORRELITHM OBJECT PROCESSING SYSTEM

TECHNICAL FIELD

The present disclosure relates generally to computer architectures for emulating a processing system, and more specifically to computer architectures for performing error detection and correction using demultiplexers and multiplexers in a correlithm object processing system.

BACKGROUND

Conventional computers are highly attuned to using operations that require manipulating ordinal numbers, especially ordinal binary integers. The value of an ordinal number corresponds with its position in a set of sequentially ordered number values. These computers use ordinal binary integers to represent, manipulate, and store information. These computers rely on the numerical order of ordinal binary integers representing data to perform various operations such as counting, sorting, indexing, and mathematical calculations. Even when performing operations that involve other number systems (e.g. floating point), conventional computers still resort to using ordinal binary integers to perform any operations.

Ordinal based number systems only provide information about the sequence order of the numbers themselves based on their numeric values. Ordinal numbers do not provide any information about any other types of relationships for the data being represented by the numeric values such as similarity. For example, when a conventional computer uses ordinal numbers to represent data samples (e.g. images or audio signals), different data samples are represented by different numeric values. The different numeric values do not provide any information about how similar or dissimilar one data sample is from another. Unless there is an exact match in ordinal number values, conventional systems are unable to tell if a data sample matches or is similar to any other data samples. As a result, conventional computers are unable to use ordinal numbers by themselves for comparing different data samples and instead these computers rely on complex signal processing techniques. Determining whether a data sample matches or is similar to other data samples is not a trivial task and poses several technical challenges for conventional computers. These technical challenges result in complex processes that consume processing power which reduces the speed and performance of the system. The ability to compare unknown data samples to known data samples is crucial for many security applications such as face recognition, voice recognition, and fraud detection.

Thus, it is desirable to provide a solution that allows computing systems to efficiently determine how similar different data samples are to each other and to perform operations based on their similarity.

SUMMARY

Conventional computers are highly attuned to using operations that require manipulating ordinal numbers, especially ordinal binary integers. The value of an ordinal number corresponds with its position in a set of sequentially ordered number values. These computers use ordinal binary integers to represent, manipulate, and store information. These computers rely on the numerical order of ordinal binary integers representing data to perform various operations such as counting, sorting, indexing, and mathematical calculations. Even when performing operations that involve other number systems (e.g. floating point), conventional computers still resort to using ordinal binary integers to perform any operations.

Ordinal based number systems only provide information about the sequence order of the numbers themselves based on their numeric values. Ordinal numbers do not provide any information about any other types of relationships for the data being represented by the numeric values such as similarity. For example, when a conventional computer uses ordinal numbers to represent data samples (e.g. images or audio signals), different data samples are represented by different numeric values. The different numeric values do not provide any information about how similar or dissimilar one data sample is from another. Unless there is an exact match in ordinal number values, conventional systems are unable to tell if a data sample matches or is similar to any other data samples. As a result, conventional computers are unable to use ordinal numbers by themselves for comparing different data samples and instead these computers rely on complex signal processing techniques. Determining whether a data sample matches or is similar to other data samples is not a trivial task and poses several technical challenges for conventional computers. These technical challenges result in complex processes that consume processing power which reduces the speed and performance of the system. The ability to compare unknown data samples to known data samples is crucial for many applications such as security application (e.g. face recognition, voice recognition, and fraud detection).

The system described in the present application provides a technical solution that enables the system to efficiently determine how similar different objects are to each other and to perform operations based on their similarity. In contrast to conventional systems, the system uses an unconventional configuration to perform various operations using categorical numbers and geometric objects, also referred to as correlithm objects, instead of ordinal numbers. Using categorical numbers and correlithm objects on a conventional device involves changing the traditional operation of the computer to support representing and manipulating concepts as correlithm objects. A device or system may be configured to implement or emulate a special purpose computing device capable of performing operations using correlithm objects. Implementing or emulating a correlithm object processing system improves the operation of a device by enabling the device to perform non-binary comparisons (i.e. match or no match) between different data samples. This enables the device to quantify a degree of similarity between different data samples. This increases the flexibility of the device to work with data samples having different data types and/or formats, and also increases the speed and performance of the device when performing operations using data samples. These technical advantages and other improvements to the device are described in more detail throughout the disclosure.

In one embodiment, the system is configured to use binary integers as categorical numbers rather than ordinal numbers which enables the system to determine how similar a data sample is to other data samples. Categorical numbers provide information about similar or dissimilar different data samples are from each other. For example, categorical numbers can be used in facial recognition applications to represent different images of faces and/or features of the faces. The system provides a technical advantage by allowing the system to assign correlithm objects represented by categorical numbers to different data samples based on how similar they are to other data samples. As an example, the system is able to assign correlithm objects to different images of people such that the correlithm objects can be directly used to determine how similar the people in the images are to each other. In other words, the system is able to use correlithm objects in facial recognition applications to quickly determine whether a captured image of a person matches any previously stored images without relying on conventional signal processing techniques.

Correlithm object processing systems use new types of data structures called correlithm objects that improve the way a device operates, for example, by enabling the device to perform non-binary data set comparisons and to quantify the similarity between different data samples. Correlithm objects are data structures designed to improve the way a device stores, retrieves, and compares data samples in memory. Correlithm objects also provide a data structure that is independent of the data type and format of the data samples they represent. Correlithm objects allow data samples to be directly compared regardless of their original data type and/or format.

A correlithm object processing system uses a combination of a sensor table, a node table, and/or an actor table to provide a specific set of rules that improve computer-related technologies by enabling devices to compare and to determine the degree of similarity between different data samples regardless of the data type and/or format of the data sample they represent. The ability to directly compare data samples having different data types and/or formatting is a new functionality that cannot be performed using conventional computing systems and data structures.

In addition, correlithm object processing system uses a combination of a sensor table, a node table, and/or an actor table to provide a particular manner for transforming data samples between ordinal number representations and correlithm objects in a correlithm object domain. Transforming data samples between ordinal number representations and correlithm objects involves fundamentally changing the data type of data samples between an ordinal number system and a categorical number system to achieve the previously described benefits of the correlithm object processing system.

Using correlithm objects allows the system or device to compare data samples (e.g. images) even when the input data sample does not exactly match any known or previously stored input values. For example, an input data sample that is an image may have different lighting conditions than the previously stored images. The differences in lighting conditions can make images of the same person appear different from each other. The device uses an unconventional configuration that implements a correlithm object processing system that uses the distance between the data samples which are represented as correlithm objects and other known data samples to determine whether the input data sample matches or is similar to the other known data samples. Implementing a correlithm object processing system fundamentally changes the device and the traditional data processing paradigm. Implementing the correlithm object processing system improves the operation of the device by enabling the device to perform non-binary comparisons of data samples. In other words, the device is able to determine how similar the data samples are to each other even when the data samples are not exact matches. In addition, the device is able to quantify how similar data samples are to one another. The ability to determine how similar data samples are to each other is unique and distinct from conventional computers that can only perform binary comparisons to identify exact matches.

The problems associated with comparing data sets and identifying matches based on the comparison are problems necessarily rooted in computer technologies. As described above, conventional systems are limited to a binary comparison that can only determine whether an exact match is found. Emulating a correlithm object processing system provides a technical solution that addresses problems associated with comparing data sets and identifying matches. Using correlithm objects to represent data samples fundamentally changes the operation of a device and how the device views data samples. By implementing a correlithm object processing system, the device can determine the distance between the data samples and other known data samples to determine whether the input data sample matches or is similar to the other known data samples. In addition, the device is able to determine a degree of similarity that quantifies how similar different data samples are to one another.

Certain embodiments of the present disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIGS. 11A and 11B illustrate an embodiment of distance tables used by the correlithm object processing system of FIG. 10.

DETAILED DESCRIPTION

FIGS. 1-5 describe various embodiments of how a correlithm object processing system may be implemented or emulated in hardware, such as a special purpose computer. FIGS. 6-12 describe different embodiments of correlithm object processing systems and methods to achieve numerous technical advantages.

Figure 1:
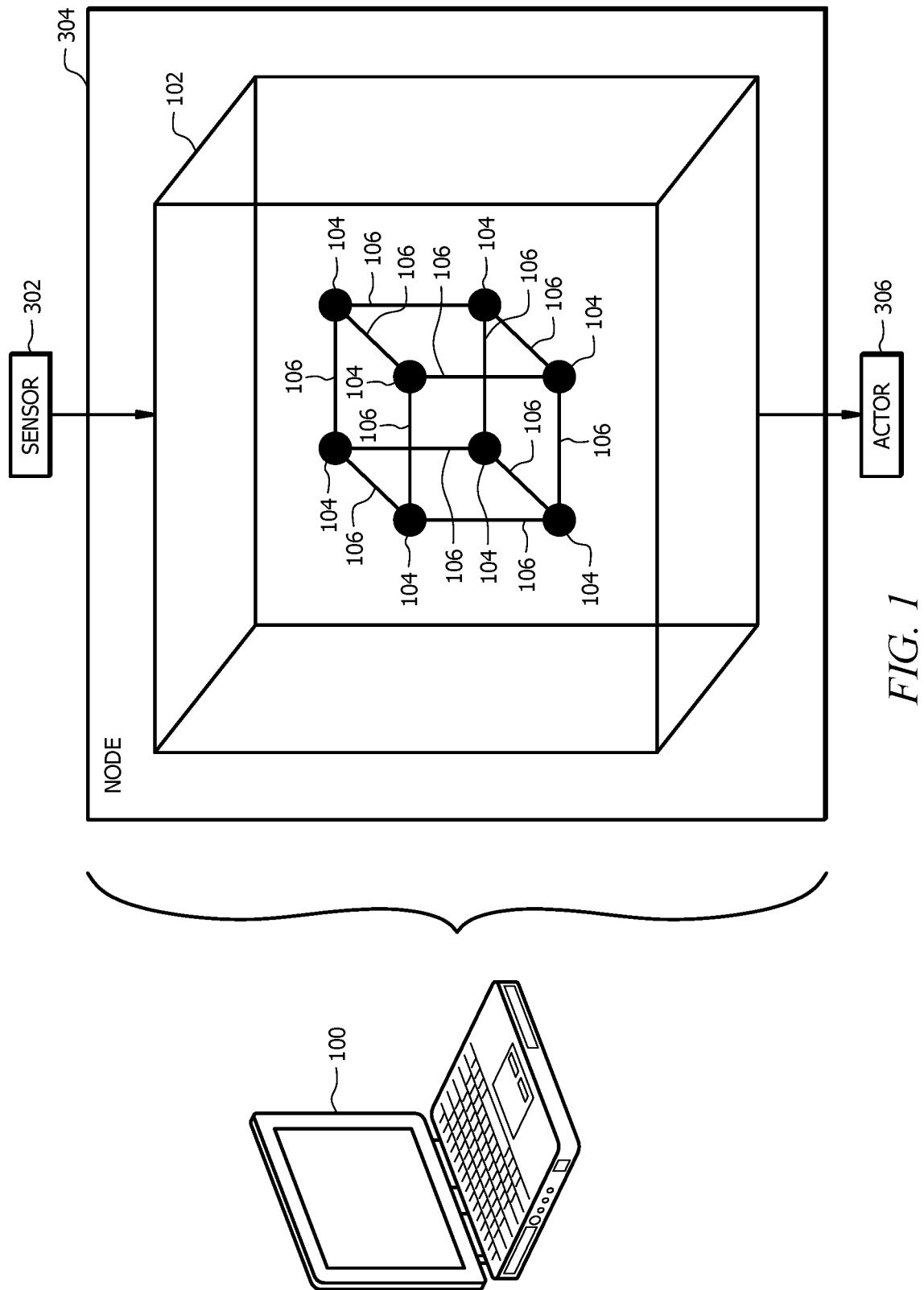
FIG. 1 is a schematic view of an embodiment of a special purpose computer implementing correlithm objects in an n-dimensional space.

FIG. 1 is a schematic view of an embodiment of a user device 100 implementing correlithm objects 104 in an n-dimensional space 102. Examples of user devices 100 include, but are not limited to, desktop computers, mobile phones, tablet computers, laptop computers, or other special purpose computer platform. The user device 100 is configured to implement or emulate a correlithm object processing system that uses categorical numbers to represent data samples as correlithm objects 104 in a high-dimensional space 102, for example a high-dimensional binary cube. Additional information about the correlithm object processing system is described in FIG. 3. Additional information about configuring the user device 100 to implement or emulate a correlithm object processing system is described in FIG. 5.

Conventional computers rely on the numerical order of ordinal binary integers representing data to perform various operations such as counting, sorting, indexing, and mathematical calculations. Even when performing operations that involve other number systems (e.g. floating point), conventional computers still resort to using ordinal binary integers to perform any operations. Ordinal based number systems only provide information about the sequence order of the numbers themselves based on their numeric values. Ordinal numbers do not provide any information about any other types of relationships for the data being represented by the numeric values, such as similarity. For example, when a conventional computer uses ordinal numbers to represent data samples (e.g. images or audio signals), different data samples are represented by different numeric values. The different numeric values do not provide any information about how similar or dissimilar one data sample is from another. In other words, conventional computers are only able to make binary comparisons of data samples which only results in determining whether the data samples match or do not match. Unless there is an exact match in ordinal number values, conventional systems are unable to tell if a data sample matches or is similar to any other data samples. As a result, conventional computers are unable to use ordinal numbers by themselves for determining similarity between different data samples, and instead these computers rely on complex signal processing techniques. Determining whether a data sample matches or is similar to other data samples is not a trivial task and poses several technical challenges for conventional computers. These technical challenges result in complex processes that consume processing power which reduces the speed and performance of the system.

In contrast to conventional systems, the user device 100 operates as a special purpose machine for implementing or emulating a correlithm object processing system. Implementing or emulating a correlithm object processing system improves the operation of the user device 100 by enabling the user device 100 to perform non-binary comparisons (i.e. match or no match) between different data samples. This enables the user device 100 to quantify a degree of similarity between different data samples. This increases the flexibility of the user device 100 to work with data samples having different data types and/or formats, and also increases the speed and performance of the user device 100 when performing operations using data samples. These improvements and other benefits to the user device 100 are described in more detail below and throughout the disclosure.

For example, the user device 100 employs the correlithm object processing system to allow the user device 100 to compare data samples even when the input data sample does not exactly match any known or previously stored input values. Implementing a correlithm object processing system fundamentally changes the user device 100 and the traditional data processing paradigm. Implementing the correlithm object processing system improves the operation of the user device 100 by enabling the user device 100 to perform non-binary comparisons of data samples. In other words, the user device 100 is able to determine how similar the data samples are to each other even when the data samples are not exact matches. In addition, the user device 100 is able to quantify how similar data samples are to one another. The ability to determine how similar data samples are to each other is unique and distinct from conventional computers that can only perform binary comparisons to identify exact matches.

The user device's 100 ability to perform non-binary comparisons of data samples also fundamentally changes traditional data searching paradigms. For example, conventional search engines rely on finding exact matches or exact partial matches of search tokens to identify related data samples. For instance, conventional text-based search engines are limited to finding related data samples that have text that exactly matches other data samples. These search engines only provide a binary result that identifies whether or not an exact match was found based on the search token. Implementing the correlithm object processing system improves the operation of the user device 100 by enabling the user device 100 to identify related data samples based on how similar the search token is to other data sample. These improvements result in increased flexibility and faster search time when using a correlithm object processing system. The ability to identify similarities between data samples expands the capabilities of a search engine to include data samples that may not have an exact match with a search token but are still related and similar in some aspects. The user device 100 is also able to quantify how similar data samples are to each other based on characteristics besides exact matches to the search token. Implementing the correlithm object processing system involves operating the user device 100 in an unconventional manner to achieve these technological improvements as well as other benefits described below for the user device 100.

Computing devices typically rely on the ability to compare data sets (e.g. data samples) to one another for processing. For example, in security or authentication applications a computing device is configured to compare an input of an unknown person to a data set of known people (or biometric information associated with these people). The problems associated with comparing data sets and identifying matches based on the comparison are problems necessarily rooted in computer technologies. As described above, conventional systems are limited to a binary comparison that can only determine whether an exact match is found. As an example, an input data sample that is an image of a person may have different lighting conditions than previously stored images. In this example, different lighting conditions can make images of the same person appear different from each other. Conventional computers are unable to distinguish between two images of the same person with different lighting conditions and two images of two different people without complicated signal processing. In both of these cases, conventional computers can only determine that the images are different. This is because conventional computers rely on manipulating ordinal numbers for processing.

In contrast, the user device 100 uses an unconventional configuration that uses correlithm objects to represent data samples. Using correlithm objects to represent data samples fundamentally changes the operation of the user device 100 and how the device views data samples. By implementing a correlithm object processing system, the user device 100 can determine the distance between the data samples and other known data samples to determine whether the input data sample matches or is similar to the other known data samples, as explained in detail below. Unlike the conventional computers described in the previous example, the user device 100 is able to distinguish between two images of the same person with different lighting conditions and two images of two different people by using correlithm objects 104. Correlithm objects allow the user device 100 to determine whether there are any similarities between data samples, such as between two images that are different from each other in some respects but similar in other respects. For example, the user device 100 is able to determine that despite different lighting conditions, the same person is present in both images.

In addition, the user device 100 is able to determine a degree of similarity that quantifies how similar different data samples are to one another. Implementing a correlithm object processing system in the user device 100 improves the operation of the user device 100 when comparing data sets and identifying matches by allowing the user device 100 to perform non-binary comparisons between data sets and to quantify the similarity between different data samples. In addition, using a correlithm object processing system results in increased flexibility and faster search times when comparing data samples or data sets. Thus, implementing a correlithm object processing system in the user device 100 provides a technical solution to a problem necessarily rooted in computer technologies.

The ability to implement a correlithm object processing system provides a technical advantage by allowing the system to identify and compare data samples regardless of whether an exact match has been previous observed or stored. In other words, using the correlithm object processing system the user device 100 is able to identify similar data samples to an input data sample in the absence of an exact match. This functionality is unique and distinct from conventional computers that can only identify data samples with exact matches.

Examples of data samples include, but are not limited to, images, files, text, audio signals, biometric signals, electric signals, or any other suitable type of data. A correlithm object 104 is a point in the n-dimensional space 102, sometimes called an "n-space." The value of represents the number of dimensions of the space. For example, an n-dimensional space 102 may be a 3-dimensional space, a 50-dimensional space, a 100-dimensional space, or any other suitable dimension space. The number of dimensions depends on its ability to support certain statistical tests, such as the distances between pairs of randomly chosen points in the space approximating a normal distribution. In some embodiments, increasing the number of dimensions in the n-dimensional space 102 modifies the statistical properties of the system to provide improved results. Increasing the number of dimensions increases the probability that a correlithm object 104 is similar to other adjacent correlithm objects 104. In other words, increasing the number of dimensions increases the correlation between how close a pair of correlithm objects 104 are to each other and how similar the correlithm objects 104 are to each other.

Correlithm object processing systems use new types of data structures called correlithm objects 104 that improve the way a device operates, for example, by enabling the device to perform non-binary data set comparisons and to quantify the similarity between different data samples. Correlithm objects 104 are data structures designed to improve the way a device stores, retrieves, and compares data samples in memory. Unlike conventional data structures, correlithm objects 104 are data structures where objects can be expressed in a high-dimensional space such that distance 106 between points in the space represent the similarity between different objects or data samples. In other words, the distance 106 between a pair of correlithm objects 104 in the n-dimensional space 102 indicates how similar the correlithm objects 104 are from each other and the data samples they represent. Correlithm objects 104 that are close to each other are more similar to each other than correlithm objects 104 that are further apart from each other. For example, in a facial recognition application, correlithm objects 104 used to represent images of different types of glasses may be relatively close to each other compared to correlithm objects 104 used to represent images of other features such as facial hair. An exact match between two data samples occurs when their corresponding correlithm objects 104 are the same or have no distance between them. When two data samples are not exact matches but are similar, the distance between their correlithm objects 104 can be used to indicate their similarities. In other words, the distance 106 between correlithm objects 104 can be used to identify both data samples that exactly match each other as well as data samples that do not match but are similar. This feature is unique to a correlithm processing system and is unlike conventional computers that are unable to detect when data samples are different but similar in some aspects.

Correlithm objects 104 also provide a data structure that is independent of the data type and format of the data samples they represent. Correlithm objects 104 allow data samples to be directly compared regardless of their original data type and/or format. In some instances, comparing data samples as correlithm objects 104 is computationally more efficient and faster than comparing data samples in their original format. For example, comparing images using conventional data structures involves significant amounts of image processing which is time consuming and consumes processing resources. Thus, using correlithm objects 104 to represent data samples provides increased flexibility and improved performance compared to using other conventional data structures.

In one embodiment, correlithm objects 104 may be represented using categorical binary strings. The number of bits used to represent the correlithm object 104 corresponds with the number of dimensions of the n-dimensional space 102 where the correlithm object 102 is located. For example, each correlithm object 104 may be uniquely identified using a 64-bit string in a 64-dimensional space 102. As another example, each correlithm object 104 may be uniquely identified using a 10-bit string in a 10-dimensional space 102. In other examples, correlithm objects 104 can be identified using any other suitable number of bits in a string that corresponds with the number of dimensions in the n-dimensional space 102.

In this configuration, the distance 106 between two correlithm objects 104 can be determined based on the differences between the bits of the two correlithm objects 104. In other words, the distance 106 between two correlithm objects can be determined based on how many individual bits differ between the correlithm objects 104. The distance 106 between two correlithm objects 104 can be computed using Hamming distance or any other suitable technique.

As an example using a 10-dimensional space 102, a first correlithm object 104 is represented by a first 10-bit string (1001011011) and a second correlithm object 104 is represented by a second 10-bit string (1000011011). The Hamming distance corresponds with the number of bits that differ between the first correlithm object 104 and the second correlithm object 104. In other words, the Hamming distance between the first correlithm object 104 and the second correlithm object 104 can be computed as follows:

```
1001011011
1000011011
--------
0001000000
```

In this example, the Hamming distance is equal to one because only one bit differs between the first correlithm object 104 and the second correlithm object. As another example, a third correlithm object 104 is represented by a third 10-bit string (0110100100). In this example, the Hamming distance between the first correlithm object 104 and the third correlithm object 104 can be computed as follows:

```
1001011011
0110100100
--------
1111111111
```

The Hamming distance is equal to ten because all of the bits are different between the first correlithm object 104 and the third correlithm object 104. In the previous example, a Hamming distance equal to one indicates that the first correlithm object 104 and the second correlithm object 104 are close to each other in the n-dimensional space 102, which means they are similar to each other. In the second example, a Hamming distance equal to ten indicates that the first correlithm object 104 and the third correlithm object 104 are further from each other in the n-dimensional space 102 and are less similar to each other than the first correlithm object 104 and the second correlithm object 104. In other words, the similarity between a pair of correlithm objects can be readily determined based on the distance between the pair correlithm objects.

As another example, the distance between a pair of correlithm objects 104 can be determined by performing an XOR operation between the pair of correlithm objects 104 and counting the number of logical high values in the binary string. The number of logical high values indicates the number of bits that are different between the pair of correlithm objects 104 which also corresponds with the Hamming distance between the pair of correlithm objects 104.

In another embodiment, the distance 106 between two correlithm objects 104 can be determined using a Minkowski distance such as the Euclidean or "straight-line" distance between the correlithm objects 104. For example, the distance 106 between a pair of correlithm objects 104 may be determined by calculating the square root of the sum of squares of the coordinate difference in each dimension.

The user device 100 is configured to implement or emulate a correlithm object processing system that comprises one or more sensors 302, nodes 304, and/or actors 306 in order to convert data samples between real-world values or representations and to correlithm objects 104 in a correlithm object domain. Sensors 302 are generally configured to convert real-world data samples to the correlithm object domain. Nodes 304 are generally configured to process or perform various operations on correlithm objects in the correlithm object domain. Actors 306 are generally configured to convert correlithm objects 104 into real-world values or representations. Additional information about sensors 302, nodes 304, and actors 306 is described in FIG. 3.

Performing operations using correlithm objects 104 in a correlithm object domain allows the user device 100 to identify relationships between data samples that cannot be identified using conventional data processing systems. For example, in the correlithm object domain, the user device 100 is able to identify not only data samples that exactly match an input data sample, but also other data samples that have similar characteristics or features as the input data samples. Conventional computers are unable to identify these types of relationships readily. Using correlithm objects 104 improves the operation of the user device 100 by enabling the user device 100 to efficiently process data samples and identify relationships between data samples without relying on signal processing techniques that require a significant amount of processing resources. These benefits allow the user device 100 to operate more efficiently than conventional computers by reducing the amount of processing power and resources that are needed to perform various operations.

Figure 2:
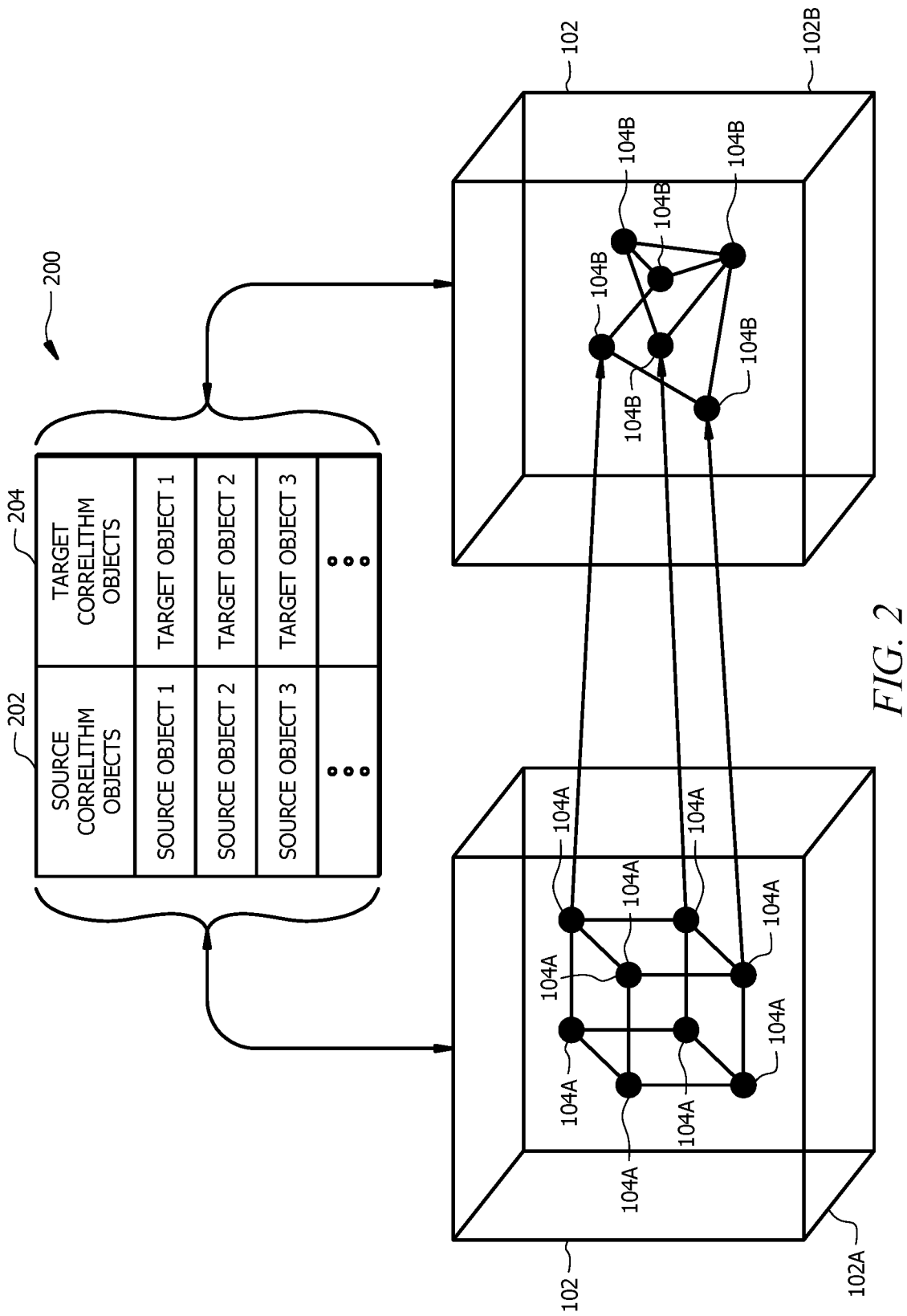
FIG. 2 is a perspective view of an embodiment of a mapping between correlithm objects in different n-dimensional spaces.

FIG. 2 is a schematic view of an embodiment of a mapping between correlithm objects 104 in different n-dimensional spaces 102. When implementing a correlithm object processing system, the user device 100 performs operations within the correlithm object domain using correlithm objects 104 in different n-dimensional spaces 102. As an example, the user device 100 may convert different types of data samples having real-world values into correlithm objects 104 in different n-dimensional spaces 102. For instance, the user device 100 may convert data samples of text into a first set of correlithm objects 104 in a first n-dimensional space 102 and data samples of audio samples as a second set of correlithm objects 104 in a second n-dimensional space 102. Conventional systems require data samples to be of the same type and/or format in order to perform any kind of operation on the data samples. In some instances, some types of data samples cannot be compared because there is no common format available. For example, conventional computers are unable to compare data samples of images and data samples of audio samples because there is no common format. In contrast, the user device 100 implementing a correlithm object processing system is able to compare and perform operations using correlithm objects 104 in the correlithm object domain regardless of the type or format of the original data samples.

In FIG. 2, a first set of correlithm objects 104A are defined within a first n-dimensional space 102A and a second set of correlithm objects 104B are defined within a second n-dimensional space 102B. The n-dimensional spaces may have the same number of dimensions or a different number of dimensions. For example, the first n-dimensional space 102A and the second n-dimensional space 102B may both be three dimensional spaces. As another example, the first n-dimensional space 102A may be a three dimensional space and the second n-dimensional space 102B may be a nine dimensional space. Correlithm objects 104 in the first n-dimensional space 102A and second n-dimensional space 102B are mapped to each other. In other words, a correlithm object 104A in the first n-dimensional space 102A may reference or be linked with a particular correlithm object 104B in the second n-dimensional space 102B. The correlithm objects 104 may also be linked with and referenced with other correlithm objects 104 in other n-dimensional spaces 102.

In one embodiment, a data structure such as table 200 may be used to map or link correlithm objects 104 in different n-dimensional spaces 102. In some instances, table 200 is referred to as a node table. Table 200 is generally configured to identify a first plurality of correlithm objects 104 in a first n-dimensional space 102 and a second plurality of correlithm objects 104 in a second n-dimensional space 102. Each correlithm object 104 in the first n-dimensional space 102 is linked with a correlithm object 104 is the second n-dimensional space 102. For example, table 200 may be configured with a first column 202 that lists correlithm objects 104A as source correlithm objects and a second column 204 that lists corresponding correlithm objects 104B as target correlithm objects. In other examples, table 200 may be configured in any other suitable manner or may be implemented using any other suitable data structure. In some embodiments, one or more mapping functions may be used to convert between a correlithm object 104 in a first n-dimensional space and a correlithm object 104 is a second n-dimensional space.

Figure 3:
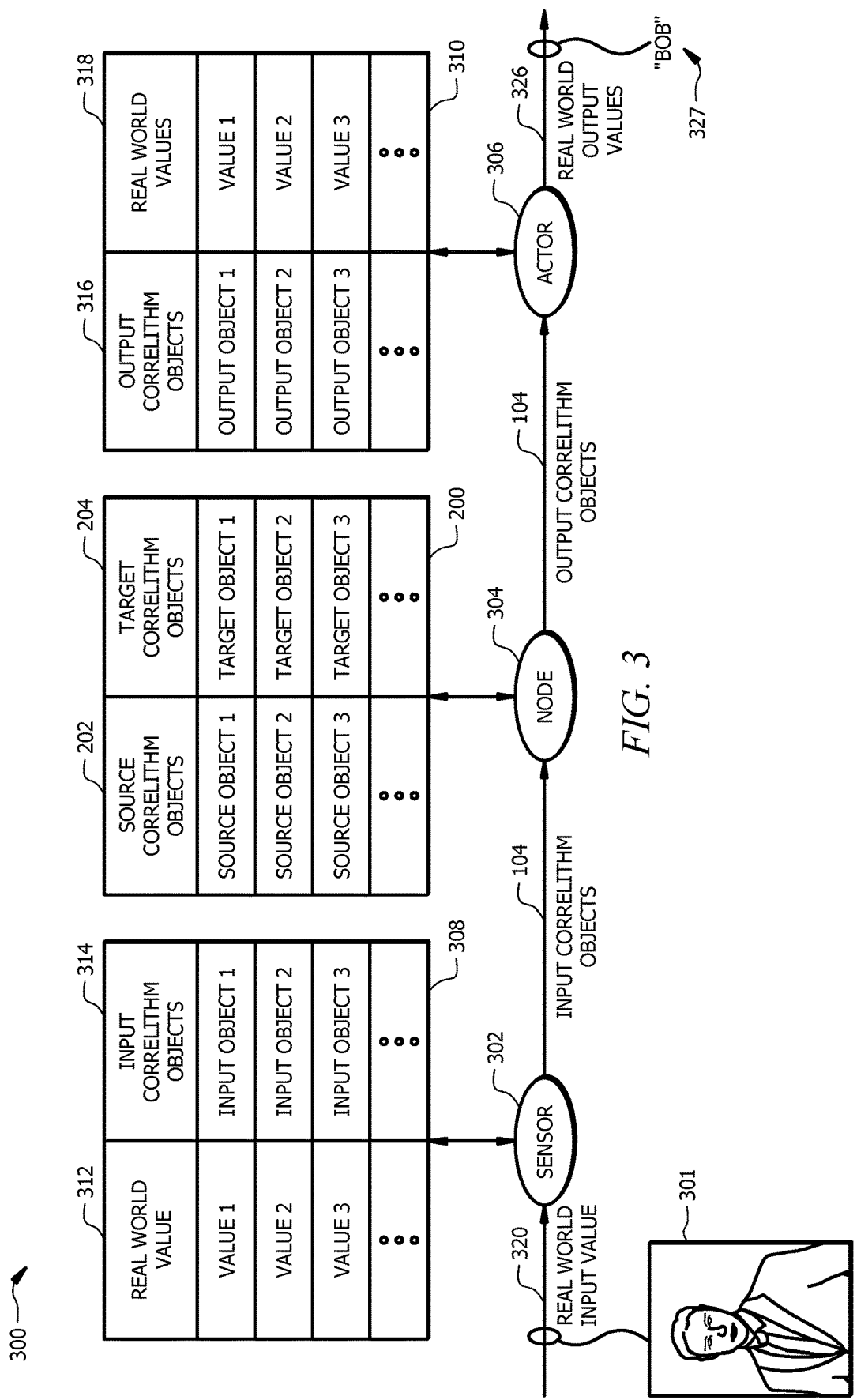
FIG. 3 is a schematic view of an embodiment of a correlithm object processing system.

FIG. 3 is a schematic view of an embodiment of a correlithm object processing system 300 that is implemented by a user device 100 to perform operations using correlithm objects 104. The system 300 generally comprises a sensor 302, a node 304, and an actor 306. The system 300 may be configured with any suitable number and/or configuration of sensors 302, nodes 304, and actors 306. An example of the system 300 in operation is described in FIG. 4. In one embodiment, a sensor 302, a node 304, and an actor 306 may all be implemented on the same device (e.g. user device 100). In other embodiments, a sensor 302, a node 304, and an actor 306 may each be implemented on different devices in signal communication with each other for example over a network. In other embodiments, different devices may be configured to implement any combination of sensors 302, nodes 304, and actors 306.

Sensors 302 serve as interfaces that allow a user device 100 to convert real-world data samples into correlithm objects 104 that can be used in the correlithm object domain. Sensors 302 enable the user device 100 to compare and perform operations using correlithm objects 104 regardless of the data type or format of the original data sample. Sensors 302 are configured to receive a real-world value 320 representing a data sample as an input, to determine a correlithm object 104 based on the real-world value 320, and to output the correlithm object 104. For example, the sensor 302 may receive an image 301 of a person and output a correlithm object 322 to the node 304 or actor 306. In one embodiment, sensors 302 are configured to use sensor tables 308 that link a plurality of real-world values with a plurality of correlithm objects 104 in an n-dimensional space 102. Real-world values are any type of signal, value, or representation of data samples. Examples of real-world values include, but are not limited to, images, pixel values, text, audio signals, electrical signals, and biometric signals. As an example, a sensor table 308 may be configured with a first column 312 that lists real-world value entries corresponding with different images and a second column 314 that lists corresponding correlithm objects 104 as input correlithm objects. In other examples, sensor tables 308 may be configured in any other suitable manner or may be implemented using any other suitable data structure. In some embodiments, one or more mapping functions may be used to translate between a real-world value 320 and a correlithm object 104 in an n-dimensional space. Additional information for implementing or emulating a sensor 302 in hardware is described in FIG. 5.

Nodes 304 are configured to receive a correlithm object 104 (e.g. an input correlithm object 104), to determine another correlithm object 104 based on the received correlithm object 104, and to output the identified correlithm object 104 (e.g. an output correlithm object 104). In one embodiment, nodes 304 are configured to use node tables 200 that link a plurality of correlithm objects 104 from a first n-dimensional space 102 with a plurality of correlithm objects 104 in a second n-dimensional space 102. A node table 200 may be configured similar to the table 200 described in FIG. 2. Additional information for implementing or emulating a node 304 in hardware is described in FIG. 5.

Actors 306 serve as interfaces that allow a user device 100 to convert correlithm objects 104 in the correlithm object domain back to real-world values or data samples. Actors 306 enable the user device 100 to convert from correlithm objects 104 into any suitable type of real-world value. Actors 306 are configured to receive a correlithm object 104 (e.g. an output correlithm object 104), to determine a real-world output value 326 based on the received correlithm object 104, and to output the real-world output value 326. The real-world output value 326 may be a different data type or representation of the original data sample. As an example, the real-world input value 320 may be an image 301 of a person and the resulting real-world output value 326 may be text 327 and/or an audio signal identifying the person. In one embodiment, actors 306 are configured to use actor tables 310 that link a plurality of correlithm objects 104 in an n-dimensional space 102 with a plurality of real-world values. As an example, an actor table 310 may be configured with a first column 316 that lists correlithm objects 104 as output correlithm objects and a second column 318 that lists real-world values. In other examples, actor tables 310 may be configured in any other suitable manner or may be implemented using any other suitable data structure. In some embodiments, one or more mapping functions may be employed to translate between a correlithm object 104 in an n-dimensional space and a real-world output value 326. Additional information for implementing or emulating an actor 306 in hardware is described in FIG. 5.

A correlithm object processing system 300 uses a combination of a sensor table 308, a node table 200, and/or an actor table 310 to provide a specific set of rules that improve computer-related technologies by enabling devices to compare and to determine the degree of similarity between different data samples regardless of the data type and/or format of the data sample they represent. The ability to directly compare data samples having different data types and/or formatting is a new functionality that cannot be performed using conventional computing systems and data structures. Conventional systems require data samples to be of the same type and/or format in order to perform any kind of operation on the data samples. In some instances, some types of data samples are incompatible with each other and cannot be compared because there is no common format available. For example, conventional computers are unable to compare data samples of images with data samples of audio samples because there is no common format available. In contrast, a device implementing a correlithm object processing system uses a combination of a sensor table 308, a node table 200, and/or an actor table 310 to compare and perform operations using correlithm objects 104 in the correlithm object domain regardless of the type or format of the original data samples. The correlithm object processing system 300 uses a combination of a sensor table 308, a node table 200, and/or an actor table 310 as a specific set of rules that provides a particular solution to dealing with different types of data samples and allows devices to perform operations on different types of data samples using correlithm objects 104 in the correlithm object domain. In some instances, comparing data samples as correlithm objects 104 is computationally more efficient and faster than comparing data samples in their original format. Thus, using correlithm objects 104 to represent data samples provides increased flexibility and improved performance compared to using other conventional data structures. The specific set of rules used by the correlithm object processing system 300 go beyond simply using routine and conventional activities in order to achieve this new functionality and performance improvements.

In addition, correlithm object processing system 300 uses a combination of a sensor table 308, a node table 200, and/or an actor table 310 to provide a particular manner for transforming data samples between ordinal number representations and correlithm objects 104 in a correlithm object domain. For example, the correlithm object processing system 300 may be configured to transform a representation of a data sample into a correlithm object 104, to perform various operations using the correlithm object 104 in the correlithm object domain, and to transform a resulting correlithm object 104 into another representation of a data sample. Transforming data samples between ordinal number representations and correlithm objects 104 involves fundamentally changing the data type of data samples between an ordinal number system and a categorical number system to achieve the previously described benefits of the correlithm object processing system 300.

Figure 4:
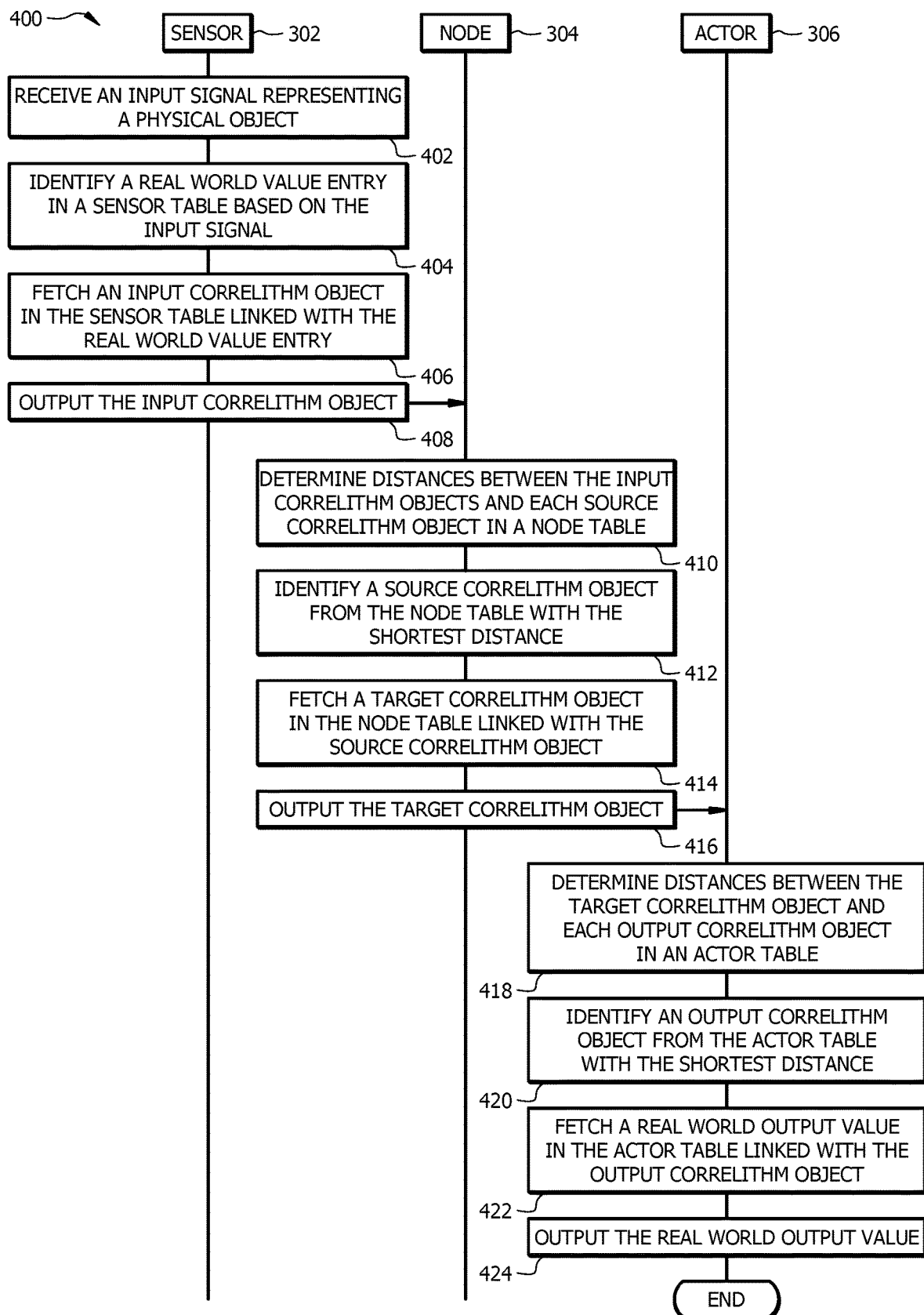
FIG. 4 is a protocol diagram of an embodiment of a correlithm object process flow.

FIG. 4 is a protocol diagram of an embodiment of a correlithm object process flow 400. A user device 100 implements process flow 400 to emulate a correlithm object processing system 300 to perform operations using correlithm object 104 such as facial recognition. The user device 100 implements process flow 400 to compare different data samples (e.g. images, voice signals, or text) to each other and to identify other objects based on the comparison. Process flow 400 provides instructions that allows user devices 100 to achieve the improved technical benefits of a correlithm object processing system 300.

Conventional systems are configured to use ordinal numbers for identifying different data samples. Ordinal based number systems only provide information about the sequence order of numbers based on their numeric values, and do not provide any information about any other types of relationships for the data samples being represented by the numeric values such as similarity. In contrast, a user device 100 can implement or emulate the correlithm object processing system 300 which provides an unconventional solution that uses categorical numbers and correlithm objects 104 to represent data samples. For example, the system 300 may be configured to use binary integers as categorical numbers to generate correlithm objects 104 which enables the user device 100 to perform operations directly based on similarities between different data samples. Categorical numbers provide information about how similar different data sample are from each other. Correlithm objects 104 generated using categorical numbers can be used directly by the system 300 for determining how similar different data samples are from each other without relying on exact matches, having a common data type or format, or conventional signal processing techniques.

A non-limiting example is provided to illustrate how the user device 100 implements process flow 400 to emulate a correlithm object processing system 300 to perform facial recognition on an image to determine the identity of the person in the image. In other examples, the user device 100 may implement process flow 400 to emulate a correlithm object processing system 300 to perform voice recognition, text recognition, or any other operation that compares different objects.

At step 402, a sensor 302 receives an input signal representing a data sample. For example, the sensor 302 receives an image of person's face as a real-world input value 320. The input signal may be in any suitable data type or format. In one embodiment, the sensor 302 may obtain the input signal in real-time from a peripheral device (e.g. a camera). In another embodiment, the sensor 302 may obtain the input signal from a memory or database.

At step 404, the sensor 302 identifies a real-world value entry in a sensor table 308 based on the input signal. In one embodiment, the system 300 identifies a real-world value entry in the sensor table 308 that matches the input signal. For example, the real-world value entries may comprise previously stored images. The sensor 302 may compare the received image to the previously stored images to identify a real-world value entry that matches the received image. In one embodiment, when the sensor 302 does not find an exact match, the sensor 302 finds a real-world value entry that closest matches the received image.

At step 406, the sensor 302 identifies and fetches an input correlithm object 104 in the sensor table 308 linked with the real-world value entry. At step 408, the sensor 302 sends the identified input correlithm object 104 to the node 304. In one embodiment, the identified input correlithm object 104 is represented in the sensor table 308 using a categorical binary integer string. The sensor 302 sends the binary string representing to the identified input correlithm object 104 to the node 304.

At step 410, the node 304 receives the input correlithm object 104 and determines distances 106 between the input correlithm object 104 and each source correlithm object 104 in a node table 200. In one embodiment, the distance 106 between two correlithm objects 104 can be determined based on the differences between the bits of the two correlithm objects 104. In other words, the distance 106 between two correlithm objects can be determined based on how many individual bits differ between a pair of correlithm objects 104. The distance 106 between two correlithm objects 104 can be computed using Hamming distance or any other suitable technique. In another embodiment, the distance 106 between two correlithm objects 104 can be determined using a Minkowski distance such as the Euclidean or "straight-line" distance between the correlithm objects 104. For example, the distance 106 between a pair of correlithm objects 104 may be determined by calculating the square root of the sum of squares of the coordinate difference in each dimension.

At step 412, the node 304 identifies a source correlithm object 104 from the node table 200 with the shortest distance 106. A source correlithm object 104 with the shortest distance from the input correlithm object 104 is a correlithm object 104 either matches or most closely matches the received input correlithm object 104.

At step 414, the node 304 identifies and fetches a target correlithm object 104 in the node table 200 linked with the source correlithm object 104. At step 416, the node 304 outputs the identified target correlithm object 104 to the actor 306. In this example, the identified target correlithm object 104 is represented in the node table 200 using a categorical binary integer string. The node 304 sends the binary string representing to the identified target correlithm object 104 to the actor 306.

At step 418, the actor 306 receives the target correlithm object 104 and determines distances between the target correlithm object 104 and each output correlithm object 104 in an actor table 310. The actor 306 may compute the distances between the target correlithm object 104 and each output correlithm object 104 in an actor table 310 using a process similar to the process described in step 410.

At step 420, the actor 306 identifies an output correlithm object 104 from the actor table 310 with the shortest distance 106. An output correlithm object 104 with the shortest distance from the target correlithm object 104 is a correlithm object 104 either matches or most closely matches the received target correlithm object 104.

At step 422, the actor 306 identifies and fetches a real-world output value in the actor table 310 linked with the output correlithm object 104. The real-world output value may be any suitable type of data sample that corresponds with the original input signal. For example, the real-world output value may be text that indicates the name of the person in the image or some other identifier associated with the person in the image. As another example, the real-world output value may be an audio signal or sample of the name of the person in the image. In other examples, the real-world output value may be any other suitable real-world signal or value that corresponds with the original input signal. The real-world output value may be in any suitable data type or format.

At step 424, the actor 306 outputs the identified real-world output value. In one embodiment, the actor 306 may output the real-world output value in real-time to a peripheral device (e.g. a display or a speaker). In one embodiment, the actor 306 may output the real-world output value to a memory or database. In one embodiment, the real-world output value is sent to another sensor 302. For example, the real-world output value may be sent to another sensor 302 as an input for another process.

Figure 5:
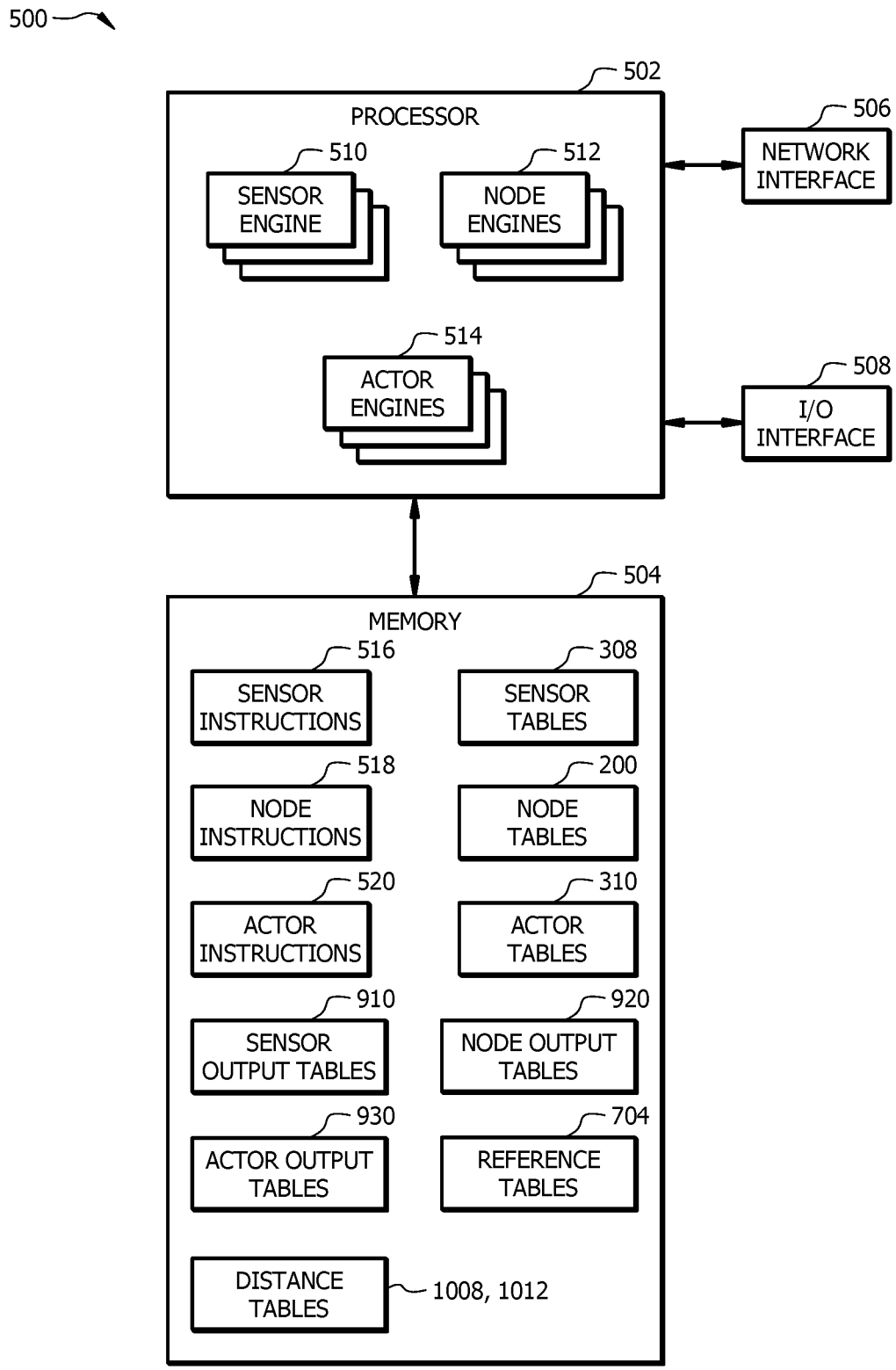
FIG. 5 is a schematic diagram of an embodiment a computer architecture for emulating a correlithm object processing system.

FIG. 5 is a schematic diagram of an embodiment of a computer architecture 500 for emulating a correlithm object processing system 300 in a user device 100. The computer architecture 500 comprises a processor 502, a memory 504, a network interface 506, and an input-output (I/O) interface 508. The computer architecture 500 may be configured as shown or in any other suitable configuration.

The processor 502 comprises one or more processors operably coupled to the memory 504. The processor 502 is any electronic circuitry including, but not limited to, state machines, one or more central processing unit (CPU) chips, logic units, cores (e.g. a multi-core processor), field-programmable gate array (FPGAs), application specific integrated circuits (ASICs), graphics processing units (GPUs), or digital signal processors (DSPs). The processor 502 may be a programmable logic device, a microcontroller, a microprocessor, or any suitable combination of the preceding. The processor 502 is communicatively coupled to and in signal communication with the memory 204. The one or more processors are configured to process data and may be implemented in hardware or software. For example, the processor 502 may be 8-bit, 16-bit, 32-bit, 64-bit or of any other suitable architecture. The processor 502 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components.

The one or more processors are configured to implement various instructions. For example, the one or more processors are configured to execute instructions to implement sensor engines 510, node engines 512, and actor engines 514. In an embodiment, the sensor engines 510, the node engines 512, and the actor engines 514 are implemented using logic units, FPGAs, ASICs, DSPs, or any other suitable hardware. The sensor engines 510, the node engines 512, and the actor engines 514 are each configured to implement a specific set of rules or process that provides an improved technological result.

In one embodiment, the sensor engine 510 is configured implement sensors 302 that receive a real-world value 320 as an input, determine a correlithm object 104 based on the real-world value 320, and output the correlithm object 104. An example operation of a sensor 302 implemented by a sensor engine 510 is described in FIG. 4.

In one embodiment, the node engine 512 is configured to implement nodes 304 that receive a correlithm object 104 (e.g. an input correlithm object 104), determine another correlithm object 104 based on the received correlithm object 104, and output the identified correlithm object 104 (e.g. an output correlithm object 104).

A node 304 implemented by a node engine 512 is also configured to compute distances between pairs of correlithm objects 104. An example operation of a node 304 implemented by a node engine 512 is described in FIG. 4.

In one embodiment, the actor engine 514 is configured to implement actors 306 that receive a correlithm object 104 (e.g. an output correlithm object 104), determine a real-world output value 326 based on the received correlithm object 104, and output the real-world output value 326. An example operation of an actor 306 implemented by an actor engine 514 is described in FIG. 4.

The memory 504 comprises one or more non-transitory disks, tape drives, or solid-state drives, and may be used as an over-flow data storage device, to store programs when such programs are selected for execution, and to store instructions and data that are read during program execution. The memory 504 may be volatile or non-volatile and may comprise read-only memory (ROM), random-access memory (RAM), ternary content-addressable memory (TCAM), dynamic random-access memory (DRAM), and static random-access memory (SRAM). The memory 504 is operable to store sensor instructions 516, node instructions 518, actor instructions 520, sensor tables 308, node tables 200, actor tables 310, reference tables 704, sensor output tables 910, node output tables 920, actor output tables 930, distance tables 1008 and 1012, and/or any other data or instructions. The sensor instructions 516, the node instructions 518, and the actor instructions 520 comprise any suitable set of instructions, logic, rules, or code operable to execute the sensor engine 510, node engine 512, and the actor engine 514, respectively.

The sensor tables 308, the node tables 200, and the actor tables 310 may be configured similar to the sensor tables 308, the node tables 200, and the actor tables 310 described in FIG. 3, respectively.

The network interface 506 is configured to enable wired and/or wireless communications. The network interface 506 is configured to communicate data with any other device or system. For example, the network interface 506 may be configured for communication with a modem, a switch, a router, a bridge, a server, or a client. The processor 502 is configured to send and receive data using the network interface 506.

The I/O interface 508 may comprise ports, transmitters, receivers, transceivers, or any other devices for transmitting and/or receiving data with peripheral devices as would be appreciated by one of ordinary skill in the art upon viewing this disclosure. For example, the I/O interface 508 may be configured to communicate data between the processor 502 and peripheral hardware such as a graphical user interface, a display, a mouse, a keyboard, a key pad, and a touch sensor (e.g. a touch screen).

Figure 6:
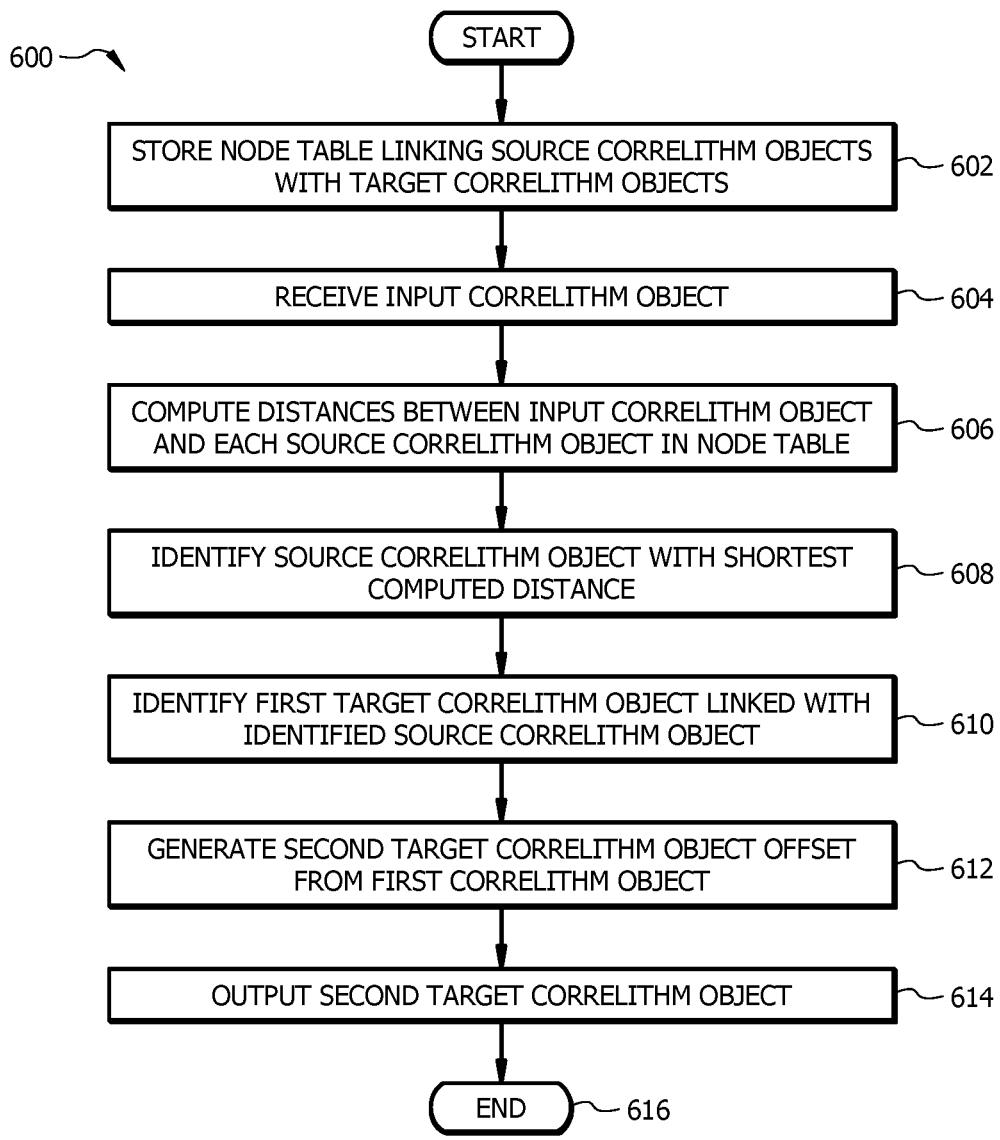
FIG. 6 illustrates an embodiment of a process for maintaining a distance metric across correlithm objects.

FIG. 6 illustrates one embodiment of a correlithm object process flow 600. A user device 100 implements process flow 600 to emulate a correlithm object processing system 300 to perform operations using correlithm objects 104. The user device 100 implements process flow 600 to compare different data samples (e.g. images, voice signals, or text) to each other and to identify other objects based on the comparison. Process flow 600 provides instructions that allows user devices 100 to achieve the improved technical benefits of a correlithm object processing system 300.

An example is provided to illustrate how the user device 100 implements process flow 600 to emulate a correlithm object processing system 300 to perform facial recognition on an image to determine the identity of the person in the image. In other examples, the user device 100 may implement process flow 600 to emulate a correlithm object processing system 300 to perform voice recognition, text recognition, or any other operation that compares different data.

At step 602, the memory 504 stores a node table 200 that links source correlithm objects 104 with target correlithm objects 104, as illustrated in FIGS. 2 and 3. At step 604, node 304 receives an input correlithm object 104 and at step 606 the node 304 determines distances 106 between the input correlithm object 104 and each source correlithm object 104 in node table 200. In one embodiment, the distance 106 between two correlithm objects 104 can be determined based on the differences between the bits of the two correlithm objects 104. In other words, the distance 106 between two correlithm objects can be determined based on how many individual bits differ between a pair of correlithm objects 104. The distance 106 between two correlithm objects 104 can be computed using Hamming distance, anti-Hamming distance, or any other suitable technique. In another embodiment, the distance 106 between two correlithm objects 104 can be determined using a Minkowski distance such as the Euclidean or "straight-line" distance between the correlithm objects 104. For example, the distance 106 between a pair of correlithm objects 104 may be determined by calculating the square root of the sum of squares of the coordinate difference in each dimension.

At step 608, node 304 identifies a source correlithm object 104 from node table 200 with the shortest distance 106. A source correlithm object 104 with the shortest distance from the input correlithm object 104 is a correlithm object 104 that either matches or most closely matches the received input correlithm object 104 from among all of the source correlithm objects 104 in node table 200.

At step 610, the node 304 identifies a first target correlithm object 104 in the node table 200 linked with the source correlithm object 104 identified at step 608. In some embodiments, it may be technically advantageous to output the first target correlithm object 104 identified at step 610 for use by the rest of the correlithm object processing system 300 despite the fact that input correlithm object 104 and the source correlithm object 104 identified at step 608 are not exact matches. For example, in a system where the input correlithm object 104 becomes altered during communication, or is modified in some other way during processing, then it may be advantageous from an error correction standpoint to find the closest match to input correlithm object 104 among source correlithm objects 104 in node table and proceed with the corresponding target correlithm object 104. This approach is described with reference to FIG. 4. In other embodiments, however, it may be advantageous to propagate any alterations experienced by input correlithm object 104 or any differences between input correlithm object 104 and the source correlithm object 104 identified at step 608 to the target correlithm object 104 that is output by node 304. This approach is described herein with respect to FIG. 6.

At step 612, node 304 generates a second target correlithm object 104 that is offset from the first target correlithm object 104 by the distance in n-dimensional space between the input correlithm object 104 received at step 604 and the source correlithm object 104 identified at step 608. For example, assume that input correlithm object 104, source correlithm objects 104 and target correlithm objects 104 are each 64-bit binary strings. Further assume that the Hamming distance between input correlithm object 104 received at step 604 and source correlithm object 104 identified at step 608 was determined to be four. In this example, node 304 may generate a second target correlithm object 104 at step 612 that differs from the first target correlithm object 104 identified at step 610 by four bits. Thus, second target correlithm object 104 generated at step 612 will be the same n-dimensional distance away from first target correlithm object 104 identified at step 610 as the n-dimensional distance between the input correlithm object 104 received at step 604 and the source correlithm object 104 identified at step 608. In this way, correlithm object processing system 300 can propagate any errors or modifications to correlithm objects 104 as they are processed while still gaining the benefits of using correlithm objects to represent data.

In another example, assume that input correlithm object 104 and source correlithm objects 104 are each 64-bit binary strings and target correlithm objects 104 are each 128-bit binary strings (i.e., they represent data in different n-dimensional spaces). Further assume that the Hamming distance between input correlithm object 104 received at step 604 and source correlithm object 104 identified at step 608 was determined to be four. In this example, node 304 may still generate a second target correlithm object 104 at step 612 that differs from the first target correlithm object 104 identified at step 610 by four bits. Thus, second target correlithm object 104 generated at step 612 will be the same n-dimensional distance away from first target correlithm object 104 identified at step 610 as the n-dimensional distance between the input correlithm object 104 received at step 604 and the source correlithm object 104 identified at step 608 despite residing in different n-dimensional spaces. In this way, correlithm object processing system 300 can propagate any errors or modifications to correlithm objects 104 as they are processed while still gaining the benefits of using correlithm objects to represent data in different n-dimensional spaces.

In still another example, assume that input correlithm object 104 and source correlithm objects 104 are each 64-bit binary strings and target correlithm objects 104 are each 128-bit binary strings (i.e., they represent data in different n-dimensional spaces). Further assume that the Hamming distance between input correlithm object 104 received at step 604 and source correlithm object 104 identified at step 608 was determined to be four. In this example, node 304 may generate a second target correlithm object 104 at step 612 that differs from the first target correlithm object 104 identified at step 610 by eight bits. Thus, second target correlithm object 104 generated at step 612 will be proportionally the same n-dimensional distance away from first target correlithm object 104 identified at step 610 (in a 128-bit space) as the n-dimensional distance between the input correlithm object 104 received at step 604 and the source correlithm object 104 identified at step 608 (in a 64-bit space) despite residing in different n-dimensional spaces. In this way, correlithm object processing system 300 can propagate any errors or modifications to correlithm objects 104 as they are processed while still gaining the benefits of using correlithm objects to represent data in different n-dimensional spaces.

At step 614, node 304 outputs the second target correlithm object 104 generated at step 612. For example, node 304 may output the second correlithm object 104 to the actor 306 illustrated in FIG. 4. In this way, some or all of steps 410 through 416 illustrated in FIG. 4 may be substituted by steps 602 through 614 of FIG. 6 in the operation of a correlithm object processing system 300.

Figure 7:
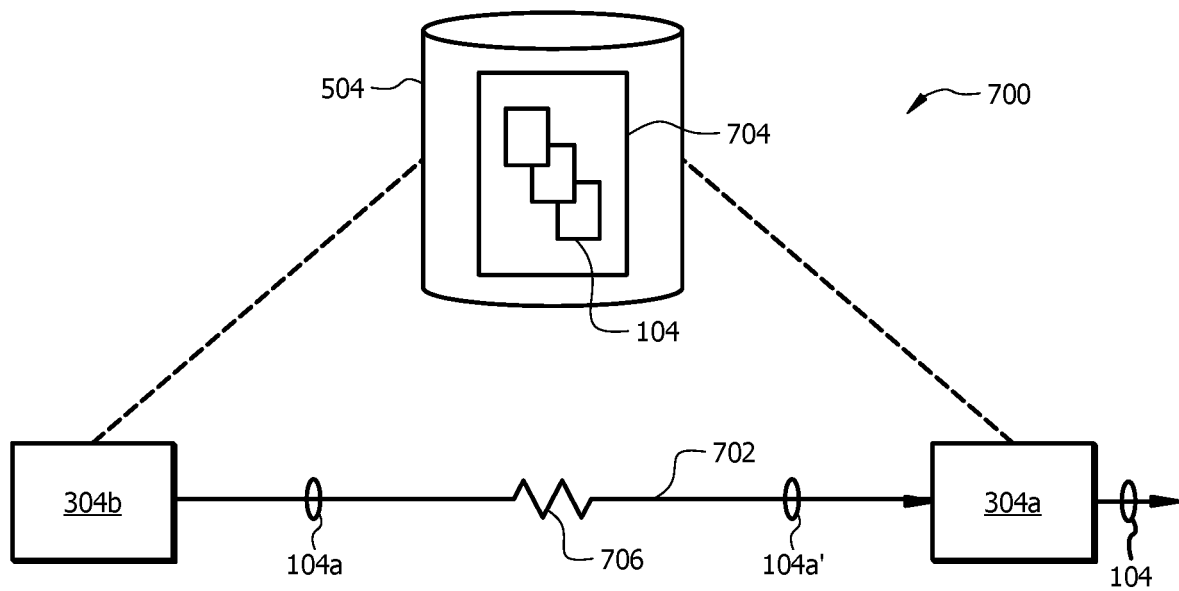
FIG. 7 illustrates an embodiment of a correlithm object processing system that performs error detection and correction.

FIG. 7 is a schematic view of an embodiment of a correlithm object processing system 700 that is implemented by one or more user devices 100 to perform operations using correlithm objects 104. In one embodiment, system 700 is a part of system 300 illustrated in FIG. 3 and can be implemented using the computer architecture 500 illustrated in FIG. 5. For example, system 700 and its constituent components can be implemented by processor 502, one or more of the engines 510, 512, 514, and 522, and other elements of computer architecture 500, described above with respect to FIG. 5. The system 700 generally includes a first node 304a communicatively coupled to a second node 304b by a communication channel 702. Communication channel 702 may be a wired and/or wireless medium. For example, communication channel 702 may be a satellite link between any number and combination of transmitting earth stations, satellites, and receiving earth stations. In another example, communication channel 702 may be a telecommunications link between one or more of a mobile device, transceiver, and base station in a cellular network. In still another embodiment, communication channel 702 may be a circuit trace that provides an electrical connection between components of an integrated circuit chip. These examples are not meant to be exhaustive and it should be understood that communication channel 702 can be any physical transmission medium between elements or components of a system. System 700 further includes a reference table 704 that stores a plurality of correlithm objects 104 that may be used by and communicated between nodes 304. Memory 504 stores reference table 704 organized in any suitable data format. In one embodiment, reference table 704 is centrally stored and accessible by one or both nodes 304a and 304b. In another embodiment, one or both of nodes 304a and 304b stores a copy of reference table 704 locally. In still another embodiment, one or both of nodes 304a and 304b may store reference table 704 locally and/or access it remotely.

In operation, second node 304b communicates a particular correlithm object 104a to first node 304a over communication channel 702. Correlithm object 104a may be one of the plurality of correlithm objects 104 stored in reference table 704. In this example, assume that communication channel 702 experiences noise 706 that can degrade the quality and/or accuracy of the information being communicated such as, for example, correlithm object 104a. Sources of noise 706 on communication channel 702 may include intermodulation noise, crosstalk, interference, atmospheric noise, industrial noise, solar noise, or cosmic noise, among others. For example, although second node 304b may transmit correlithm object 104a over communication channel 702, due to noise 706, first node 304a might receive an altered version of correlithm object 104, referred to as correlithm object 104a'. Depending on the magnitude and type of noise 706, the effect on correlithm object 104 might range from small to large. In such a situation, second node 304b may be able to leverage the nature of correlithm objects 104 to perform error correction, as described below.

To do this, first node 304a may compare received correlithm object 104' with the plurality of correlithm objects 104 stored in reference table 704 to identify the particular correlithm object 104 that was transmitted by second node 304b. In particular, first node 304 may determine the distances in n-dimensional space between correlithm object 104a' and each of the plurality of correlithm objects 104 stored in reference table 704. In one embodiment, these distances may be determined by calculating Hamming distances between correlithm object 104a' and each of the plurality of correlithm objects 104. In another embodiment, these distances may be determined by calculating the anti-Hamming distances between correlithm object 104a' and each of the plurality of correlithm objects 104. As described above, the Hamming distance is determined based on the number of bits that differ between the binary string representing correlithm object 104a' and each of the binary strings representing each of the correlithm objects 104 stored in reference table 704. The anti-Hamming distance may be determined based on the number of bits that are the same between the binary string representing correlithm object 104a' and each of the binary strings representing each of the correlithm objects 104 stored in reference table 704. In still other embodiments, the distances in n-dimensional space between correlithm object 104a' and each of the correlithm objects 104 stored in reference table 704 may be determined using a Minkowski distance or a Euclidean distance.

Upon calculating the distances between correlithm object 104a' and each of the plurality of correlithm objects 104 stored in reference table 704 using one of the techniques described above, first node 304a determines which calculated distance is the shortest distance. This is because the correlithm object 104 stored in reference table 704 having the shortest distance between it and the correlithm object 104a' received by first node 304a is likely to be the correlithm object 104a that was transmitted by second node 304b. For example, if correlithm object 104a transmitted by second node 304b and the correlithm object 104a' received by first node 304a are 64-bit binary strings and they differ by only four bits (e.g., Hamming distance is four) whereas the distance in n-dimensional space between correlithm object 104a' and each of the other correlithm objects 104 stored in reference table 704 is somewhere between twenty-four and forty bits (e.g., Hamming distance of between twenty-four and forty), then the correlithm object 104 that only had a four bit difference is most likely the unaltered version of the correlithm object 104a' received at first node 304a. Accordingly, first node 304a may perform error correction by outputting the correlithm object 104 that was determined to have the shortest distance between it and correlithm object 104a'.

In a particular embodiment, if the distance between the correlithm object 104a' and each of the correlithm objects 104 stored in reference table 704 is not within a predetermined number of standard deviations in n-dimensional space, then node 304 may discard correlithm object 104a' and, instead, output an alert reporting that correlithm object 104a' was too corrupted to use for further processing in the system 700. In this embodiment, second node 304b may be prompted to communicate correlithm object 104a again, or to communicate it over a different communication channel to first node 304a. To account for the situation where communication channel 702 experiences too much noise causing correlithm object 104a' to be unusable, the system 700 may be modified as illustrated in FIG. 8, and described further below.

Figure 8:
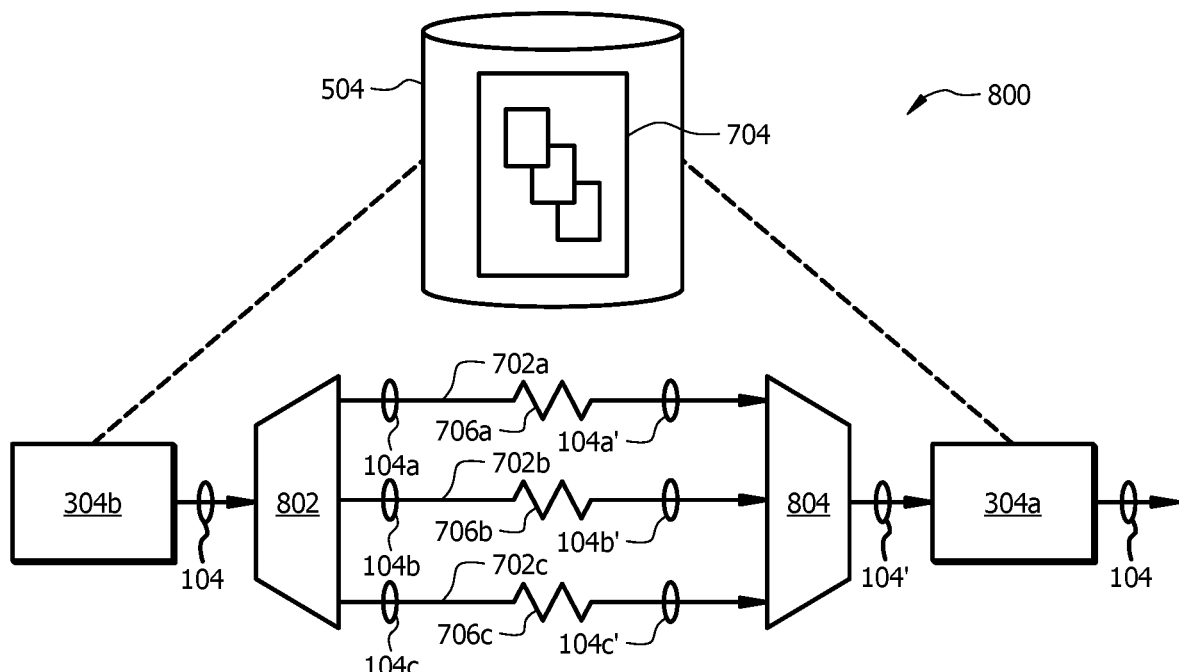
FIG. 8 illustrates an embodiment of a correlithm object processing system that performs error correction using demultiplexers and multiplexers.

FIG. 8 is a schematic view of an embodiment of a correlithm object processing system 800 that is implemented by one or more user devices 100 to perform operations using correlithm objects 104. System 800 and its constituent components can be implemented by processor 502, one or more of the engines 510, 512, and 514, and other elements of computer architecture 500, described above with respect to FIG. 5. In one embodiment, system 800 is a part of system 300 illustrated in FIG. 3. The system 800 generally includes a first node 304a communicatively coupled to a second node 304b by a plurality of communication channels 702a, 702b, and 702c. Although FIG. 8 illustrates three communication channels 702 between first node 304a and second node 304b, it should be understood that system 800 may include any suitable number of communication channels 702 greater than one. System 700 further includes demultiplexer 802 and multiplexer 800, which can be implemented by processor 500 of the computer architecture 500, described above with respect to FIG. 5. Demultiplexer 802 is a device that takes information from a single input line and routes it to over several output lines. Conversely, multiplexer 800 is a device that combines information received over several input lines and forwards it over a single output line. Although the other elements of system 800 refer to the corresponding elements of system 700, the operation of system 800 is slightly different from the operation of system 700 in that correlithm object 104 is split into different portions that are communicated to first node 304a over different communication channels 702a, 702b, and 702c in order to minimize the risk that any given communication channel 702 is too noisy.

In operation, second node 304b communicates a particular correlithm object 104a to first node 304a via demultiplexer 802, communication channels 702a, 702b, and 702c, and multiplexer 804. Correlithm object 104a may be one of the plurality of correlithm objects 104 stored in reference table 704.

Demultiplexer 802 receives correlithm object 104 from second node 304b and divides it into a plurality of different portions, such as first portion 104a, second portion 104b, and third portion 104b. In a particular embodiment where correlithm object 104 is a 64-bit binary string, for example, demultiplexer node 802 may divide correlithm object 104 into a first portion 104a that includes the first sixteen bits of the binary string, second portion 104b that includes the second sixteen bits of the binary string, and third portion 104c that includes the last sixteen bits of the binary string. In other embodiments, the grouping of bits from the 64-bit binary string of correlithm object 104 may be different among first portion 104a, second portion 104b, and third portion 104c. In still other embodiments, the sizes of the first portion 104a, second portion 104b, and third portion 104c are not necessarily the same as each other. For example, a larger portion of the correlithm object 104 may be sent over communication channels 702 that are reported to have a lower bit error rate which a smaller portion of the correlithm object 104 may be sent over communication channels 702 that are reported to have a higher bit error rate. Demultiplexer 802 transmits first portion 104a over communication channel 702a, second portion 104b over communication channel 702b, and third portion 104c over communication channel 702c.

Multiplexer 804 is communicatively coupled to demultiplexer 802 by communication channels 702a, 702b, and 702c. Multiplexer 804 receives first portion 104a over communication channel 702a, second portion 104b over communication channel 702b, and third portion 104c over communication channel 702c. As with communication channel 702 described in system 700, communication channels 702a, 702b, and 702c may experience different levels of noise 706a, 706b, and 706c, respectively, which might cause multiplexer 804 to receive altered versions of correlithm objects 104a, 104b, and 104c. Because multiplexer 804 combines first portion 104a', second portion 104b', and third portion 104c' into correlithm object 104', the noise 706a, 706b, and 706c in communication channels 702a, 702b, and 702c, respectively, might cause first node 304a to receive an altered version of correlithm object 104, referred to as correlithm object 104a'. Depending on the magnitude and type of noise 706a, 706b, and 706c, the effect on correlithm object 104 might range from small to large.

As mentioned briefly above, multiplexer 804 receives first portion 104a', second portion 104b', and third portion 104c' and combines them to form correlithm object 104'. In general, multiplexer 804 combines the various bits of first portion 104a', second portion 104b', and third portion 104c' in a manner corresponding to and consistent with the manner in which demultiplexer 802 divided correlithm object 104 into first portion 104a, second portion 104b, and third portion 104c. For example, multiplexer node 804 may combine the sixteen bits of first portion 104a' with the sixteen bits of second portion 104b' and the sixteen bits of third portion 104c' to form a 64-bit binary string that represents correlithm object 104'. Because the levels of noise 706a, 706b, and 706c may be different among communication channels 702a, 702b, and 702c, the risk of a singular noisy channel that renders correlithm object 104' unusable is reduced by splitting up correlithm object 104, communicating it to first node 304a over multiple different communication channels 702a, 702b, and 702c, and then recombining those different portions into correlithm object 104'.

In a particular embodiment, however, it is possible that a particular communication 702 in system 800 is so noisy that it fails. For example, if communication channel 702b is extremely noisy such that it fails, then multiplexer node 804 may receive first portion 104a' and third portion 104c', but it may not receive second portion 104b'. In this example, multiplexer node 804 may randomly generate a suitable binary string (e.g., 16-bit binary string) that may substitute for the second portion 104b' that multiplexer 804 was supposed to receive over communication channel 702b. In particular, multiplexer node 804 may randomly select 1's and 0's to create a suitable binary string that may substitute for the second portion 104b' that multiplexer 804 was supposed to receive over communication channel 702b. Then, multiplexer 804 may combine first portion 104a' with the randomly created binary string and third portion 104c' to generate correlithm object 104'.

As described above with respect to system 700 and elsewhere above, first node 304a of system 800 compares correlithm object 104' with each of the correlithm objects 104 stored in reference table 704 to determine which has the shortest distance between them in n-dimensional space. The correlithm object 104 stored in reference table 704 having the shortest distance between it and the correlithm object 104' received by first node 304a is likely to be the correlithm object 104 that was transmitted by second node 304b. Accordingly, first node 304a may perform error correction by outputting the correlithm object 104 that was determined to have the shortest distance between it and correlithm object 104'.

Figure 9:
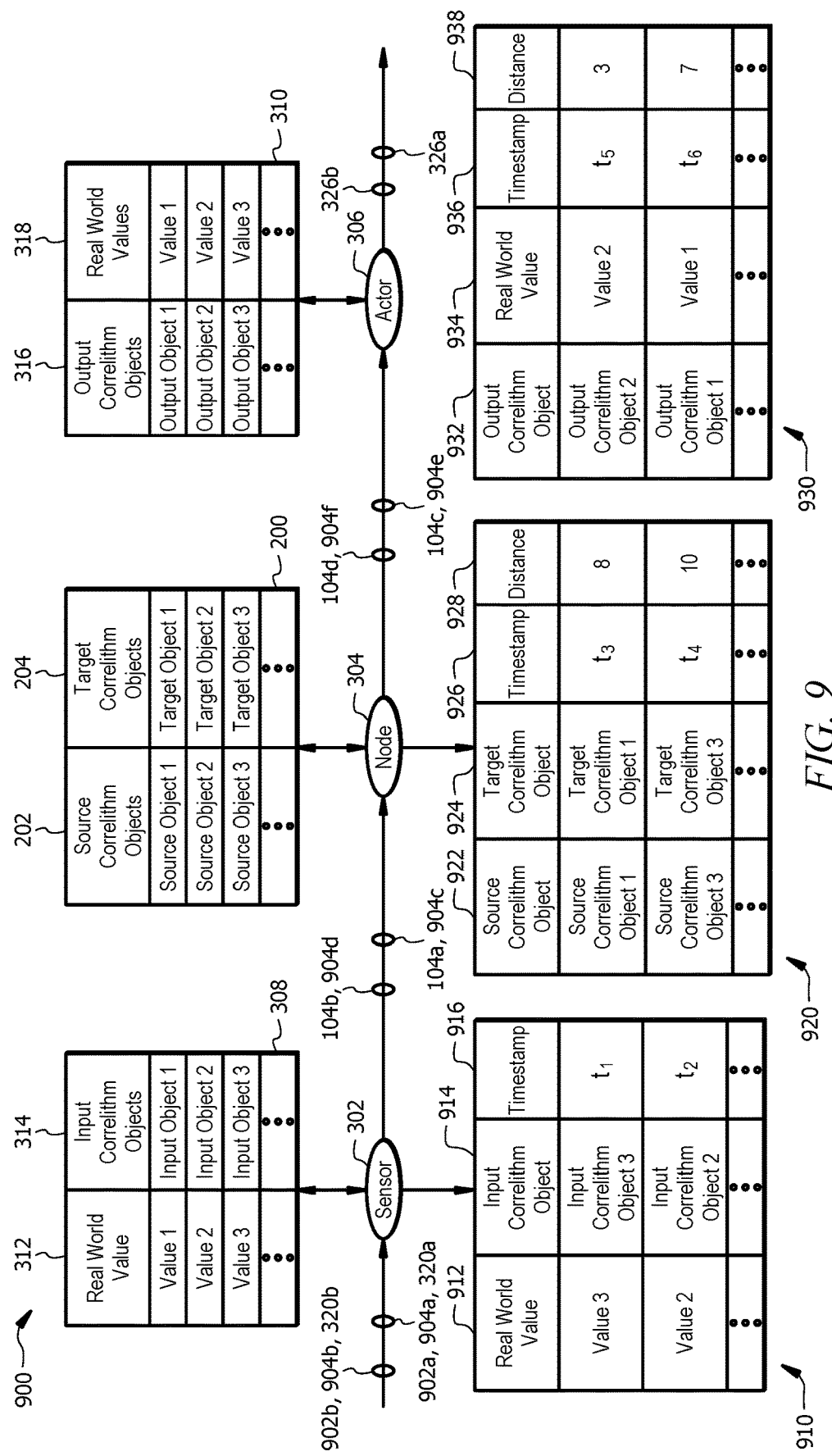
FIG. 9 illustrates an embodiment of a correlithm object processing system that implements transparency and traceability.

FIG. 9 is a schematic view of an embodiment of a correlithm object processing system 900 that is implemented by a user device 100 to perform operations using correlithm objects 104. The system 900 is a variation of the system 300 illustrated in FIG. 3 and can be implemented using the computer architecture 500 illustrated in FIG. 5. For example, system 900 and its constituent components can be implemented by processor 502, one or more of the engines 510, 512, and 514, and other elements of computer architecture 500, described above with respect to FIG. 5. As with system 300, system 900 may be configured with any suitable number and/or configuration of sensors 302, nodes 304, and actors 306. In one embodiment, a sensor 302, a node 304, and an actor 306 may all be implemented on the same device (e.g. user device 100). In other embodiments, a sensor 302, a node 304, and an actor 306 may each be implemented on different devices 100 in signal communication with each other, for example over a network. In other embodiments, different devices 100 may be configured to implement any combination of sensors 302, nodes 304, and actors 306.

Sensors 302 serve as interfaces that allow a user device 100 to convert real-world data samples into correlithm objects 104 that can be used in the correlithm object domain. In general, sensors 302 are configured to receive an input signal 902 associated with a timestamp 904 and that includes a real-world value 320 representing a data sample. Sensor 302 is further configured to determine a correlithm object 104 based on the real-world value 320, and to output the correlithm object 104. In one embodiment, sensors 302 are configured to use sensor tables 308 that link a plurality of real-world values with a plurality of correlithm objects 104 in an n-dimensional space 102. Real-world values are any type of signal, value, or representation of data samples. As explained with respect to FIG. 3, a sensor table 308 may be configured with a first column 312 that lists real-world value entries and a second column 314 that lists corresponding correlithm objects 104 as input correlithm objects. In other examples, sensor tables 308 may be configured in any other suitable manner or may be implemented using any other suitable data structure. In some embodiments, one or more mapping functions may be used to translate between a real-world value 320 and a correlithm object 104 in an n-dimensional space.

In operation, for example, sensor 302 may receive a first input signal 902a associated with a first timestamp 904a where the input signal 902a includes a first real-world value 320a. First real-world value 320a may correspond to value 3 listed in column 312 of sensor table 308 and map to input correlithm object 3 listed in column 314 of sensor table 308. Thus, sensor 302 may communicate input correlithm object 3 as an output.

System 900 may further include a sensor output table 910 that is configured with a first column 912 that lists real-world values 320 received in input signals 902, second column 914 that lists input correlithm objects that are mapped to those real-world values 320 by sensor 302 using sensor table 308, and third column 916 that lists timestamps 904 associated with those real-world values 320. Thus, for example, because first real-world value 320a was received in conjunction with input signal 902a and corresponded to value 3 in sensor table 308, the first entry of sensor output table 910 lists value 3 in column 912. Furthermore, because value 3 was mapped to input correlithm object 3 in sensor table 308, the first entry of sensor output table 910 lists input correlithm object 3 in column 914. Finally, because input signal 902a that contained real-world value 320a was associated with timestamp 904a, the first entry of sensor output table 910 lists timestamp 904a, represented by $t_1$, in column 916.

In further operation of system 900, sensor 302 may receive a second input signal 902b associated with a second timestamp 904b where the second input signal 902b includes a second real-world value 320b. Second real-world value 320b may correspond to value 2 listed in column 312 of sensor table 308 and map to input correlithm object 2 listed in column 314 of sensor table 308. Thus, sensor 302 may communicate input correlithm object 2 as an output. Because second real-world value 320b was received in conjunction with second input signal 902b and corresponded to value 2 in sensor table 308, the second entry of sensor output table 910 lists value 2 in column 912. Furthermore, because value 2 was mapped to input correlithm object 2 in sensor table 308, the second entry of sensor output table 910 lists input correlithm object 2 in column 914. Finally, because second input signal 902b that contained real-world value 320b was associated with timestamp 904b, the second entry of sensor output table 910 lists timestamp 904b, represented by $t_2$, in column 916. Sensor output table 910 may include any number of additional entries associated with other input signals 902 received by sensor 302. Thus, sensor output table 910 logs the inputs, outputs, and associated timestamps of a corresponding sensor 302 to provide transparency into the operation of sensor 302 for future reference and analysis. In particular, the sensor output table 910 supports examination into what inputs and outputs are associated with sensor 302 over time.

Nodes 304 are configured to receive a correlithm object 104 (e.g. an input correlithm object 104), to determine another correlithm object 104 based on the received correlithm object 104, and to output the identified correlithm object 104 (e.g. an output correlithm object 104). In one embodiment, nodes 304 are configured to use node tables 200 that link a plurality of correlithm objects 104 from a first n-dimensional space 102 with a plurality of correlithm objects 104 in a second n-dimensional space 102. A node table 200 illustrated in FIG. 9 may be configured similar to the table 200 described in FIG. 2.

In general, node 304 receives the input correlithm object 104 from sensor 302 and determines distances 106 between the input correlithm object 104 and each source correlithm object 104 in a node table 200. In one embodiment, the distance 106 between two correlithm objects 104 can be determined based on the differences between the bits of the two correlithm objects 104. In other words, the distance 106 between two correlithm objects can be determined based on how many individual bits differ between a pair of correlithm objects 104. The distance 106 between two correlithm objects 104 can be computed using Hamming distance, anti-Hamming distance, or any other suitable technique. In another embodiment, the distance 106 between two correlithm objects 104 can be determined using a Minkowski distance such as the Euclidean or "straight-line" distance between the correlithm objects 104. For example, the distance 106 between a pair of correlithm objects 104 may be determined by calculating the square root of the sum of squares of the coordinate difference in each dimension.

The node 304 identifies a source correlithm object 104 from the node table 200 with the shortest distance 106. A source correlithm object 104 with the shortest distance from the input correlithm object 104 is a correlithm object 104 that either matches or most closely matches the received input correlithm object 104. The node 304 identifies and fetches a target correlithm object 104 in the node table 200 linked with the source correlithm object 104. The node 304 outputs the identified target correlithm object 104 to the actor 306. In this example, the identified target correlithm object 104 is represented in the node table 200 using a categorical binary integer string. The node 304 sends the binary string representing the identified target correlithm object 104 to the actor 306.

In an example operation, node 304 may receive a first input correlithm object 104a associated with a third timestamp 904c where the first input correlithm object 104a was determined by sensor 302 from first real-world value 320a (i.e., value 3) of first input signal 902a. Node 200 may determine that first input correlithm object 104a has the shortest n-dimensional distance to source correlithm object 1 listed in column 202 of node table 200, using any suitable technique explained above (e.g., Hamming distance of eight for 64-bit correlithm objects), and map to target correlithm object 1 listed in column 204 of node table 200. Thus, node 304 may communicate target correlithm object 1 as an output, referenced as target correlithm object 104c in FIG. 9.

System 900 may further include a node output table 920 that is configured with a first column 922 that lists source correlithm objects determined by node 304 from input correlithm objects, second column 924 that lists target correlithm objects that are mapped to those source correlithm objects in node table 200, third column 926 that lists timestamps 904 associated with those source correlithm objects, and fourth column 928 that lists the n-dimensional distance calculation made by node 304 to determine a source correlithm object from the input correlithm object (e.g., Hamming distance). Thus, for example, because first input correlithm object 104a was received by node 304 from sensor 302 and corresponded to source correlithm object 1 in node table 200, the first entry of node output table 920 lists source correlithm object 1 in column 922. Furthermore, because source correlithm object 1 was mapped to target correlithm object 1 in node table 200, the first entry of node output table 920 lists target correlithm object 1 in column 924. Additionally, because input correlithm object 104a that corresponded to source correlithm object 1 was associated with timestamp 904c, the first entry of node output table 920 lists timestamp 904, represented by t3, in column 926. Finally, consider that node 304 determined a Hamming distance of eight for the n-dimensional distance between input correlithm object 3 received from sensor 302 and source correlithm object 1 in node table 200 (e.g., assuming 64-bit correlithm objects). Accordingly, first entry of node output table 920 lists a Hamming distance of eight in column 928.

In further operation of system 900, node 304 may receive a second input correlithm object 104b associated with a fourth timestamp 904d where the second input correlithm object 104b was determined by sensor 302 from second real-world value 320b (i.e., value 2) of second input signal 902b. Node 200 may determine that second input correlithm object 104b has the shortest n-dimensional distance to source correlithm object 3 listed in column 202 of node table 200, using any suitable technique explained above (e.g., Hamming distance of ten for 64-bit correlithm objects), and map to target correlithm object 3 listed in column 204 of node table 200. Thus, node 304 may communicate target correlithm object 3 as an output, referenced as target correlithm object 104d in FIG. 9.

Because second input correlithm object 104b was received by node 304 from sensor 302 and corresponded to source correlithm object 3 in node table 200, the second entry of node output table 920 lists source correlithm object 3 in column 922. Furthermore, because source correlithm object 3 was mapped to target correlithm object 3 in node table 200, the second entry of node output table 920 lists target correlithm object 3 in column 924. Additionally, because input correlithm object 104b that corresponded to source correlithm object 3 was associated with timestamp 904d, the second entry of node output table 920 lists timestamp 904d, represented by t4, in column 926. Finally, consider that node 304 determined a Hamming distance of ten for the n-dimensional distance between input correlithm object 1 received from sensor 302 and source correlithm object 3 in node table 200 (e.g., assuming 64-bit correlithm objects). Accordingly, second entry of node output table 920 lists a Hamming distance of ten in column 928. Node output table 920 may include any number of additional entries associated with other input correlithm objects 104 received by node 304.

Thus, node output table 920 logs the inputs, outputs, and associated timestamps of a corresponding node 304 to provide transparency into the operation of node 304 for future reference and analysis. In particular, the node output table 920 supports examination into what inputs and outputs are associated with node 304 over time. In addition, node output table 920 also logs the n-dimensional distance calculations (e.g., Hamming distances) determined by node 304 to provide traceability into the operation of node 304 for future reference and analysis. In particular, the node output table 920 supports examination into why certain inputs and outputs were selected from node table 200 and used during the operation of the node 304 over time.

Actors 306 serve as interfaces that allow a user device 100 to convert correlithm objects 104 in the correlithm object domain back to real-world values or data samples. Actors 306 enable the user device 100 to convert from correlithm objects 104 into any suitable type of real-world value. Actors 306 are configured to receive a correlithm object 104 (e.g. an output correlithm object 104), to determine a real-world output value 326 based on the received correlithm object 104, and to output the real-world output value 326. The real-world output value 326 may be a different data type or representation of the original data sample. In one embodiment, actors 306 are configured to use actor tables 310 that link a plurality of correlithm objects 104 in an n-dimensional space 102 with a plurality of real-world values. As described above with respect to FIG. 3, an actor table 310 may be configured with a first column 316 that lists correlithm objects 104 as output correlithm objects and a second column 318 that lists real-world values. In other examples, actor tables 310 may be configured in any other suitable manner or may be implemented using any other suitable data structure. In some embodiments, one or more mapping functions may be employed to translate between a correlithm object 104 in an n-dimensional space and a real-world output value 326.

In general, actor 306 receives the target correlithm object 104 and determines distances between the target correlithm object 104 and each output correlithm object 104 in an actor table 310. The actor 306 may compute the distances between the target correlithm object 104 and each output correlithm object 104 in an actor table 310 using one of the techniques described above. Actor 306 identifies an output correlithm object 104 from the actor table 310 with the shortest distance 106. An output correlithm object 104 with the shortest distance from the target correlithm object 104 is a correlithm object 104 that either matches or most closely matches the received target correlithm object 104.

Actor 306 identifies and fetches a real-world output value in the actor table 310 linked with the identified output correlithm object 104. The real-world output value may be any suitable type and format of data sample. Actor 306 outputs the identified real-world output value. In one embodiment, the actor 306 may output the real-world output value to a peripheral device. In another embodiment, the actor 306 may output the real-world output value to a memory or database. In still another embodiment, the real-world output value is sent to another sensor 302. For example, the real-world output value may be sent to another sensor 302 as an input for another process.

In operation, for example, actor 306 may receive a first target correlithm object 104c associated with a fifth timestamp 904e where the first target correlithm object 104c was determined by node 304 from first source correlithm object (i.e., source correlithm object 1) and first input correlithm object 104a. Actor 306 may determine that first target correlithm object 104c has the shortest n-dimensional distance to output correlithm object 2 listed in column 316 of actor table 310, using any suitable technique explained above (e.g., Hamming distance of three for 64-bit correlithm objects), and map to real-world value 2 listed in column 318 of actor table 310. Thus, actor 306 may communicate real-world value 2 as an output, referenced as real-world value 326a in FIG. 9.

System 900 may further include actor output table 930 that is configured with a first column 932 that lists output correlithm objects determined by node 306 from target correlithm objects, second column 934 that lists real-world values that are mapped to those output correlithm objects in actor table 310, third column 936 that lists timestamps 904 associated with those output correlithm objects, and fourth column 938 that lists the n-dimensional distance calculation made by actor 306 to determine a output correlithm object from the target correlithm object (e.g., Hamming distance). Thus, for example, because first target correlithm object 104c was received by actor 306 from node 304 and corresponded to output correlithm object 2 in actor table 310, the first entry of actor output table 930 lists output correlithm object 2 in column 932. Furthermore, because output correlithm object 2 was mapped to real-world value 2 in actor table 310, the first entry of actor output table 930 lists real-world value 2 in column 934. Additionally, because target correlithm object 104c that corresponded to output correlithm object 2 was associated with timestamp 904e, the first entry of actor output table 930 lists timestamp 904e, represented by $t_5$, in column 936. Finally, consider that actor 306 determined a Hamming distance of three for the n-dimensional distance between target correlithm object 1 received from node 304 and output correlithm object 2 in actor table 310 (e.g., assuming 64-bit correlithm objects). Accordingly, first entry of actor output table 930 lists a Hamming distance of three in column 938.

In further operation of system 900, actor 306 may receive a second target correlithm object 104d associated with a sixth timestamp 904f where the second target correlithm object 104d was determined by node 304 from second source correlithm object (i.e., source correlithm object 3) and second input correlithm object 104b. Actor 306 may determine that second target correlithm object 104d has the shortest n-dimensional distance to output correlithm object 1 listed in column 316 of actor table 310, using any suitable technique explained above (e.g., Hamming distance of seven for 64-bit correlithm objects), and map to real-world value 1 listed in column 318 of actor table 310. Thus, actor 306 may communicate real-world value 1 as an output, referenced as real-world value 326b in FIG. 9.

Because second target correlithm object 104d was received by actor 306 from node 304 and corresponded to output correlithm object 1 in actor table 310, the second entry of actor output table 930 lists output correlithm object 1 in column 932. Furthermore, because output correlithm object 1 was mapped to real-world value 1 in actor table 310, the second entry of actor output table 930 lists real-world value 1 in column 934. Additionally, because target correlithm object 104d that corresponded to output correlithm object 1 was associated with timestamp 904f, the second entry of actor output table 930 lists timestamp 904f, represented by $t_6$, in column 936. Finally, consider that actor 306 determined a Hamming distance of seven for the n-dimensional distance between target correlithm object 3 received from node 304 and output correlithm object 1 in actor table 310 (e.g., assuming 64-bit correlithm objects). Accordingly, second entry of actor output table 930 lists a Hamming distance of seven in column 938.

Thus, actor output table 930 logs the inputs, outputs, and associated timestamps of a corresponding actor 306 to provide transparency into the operation of actor 306 for future reference and analysis. In particular, the actor output table 930 supports examination into what inputs and outputs are associated with actor 306 over time. In addition, actor output table 930 also logs the n-dimensional distance calculations (e.g., Hamming distances) determined by actor 306 to provide traceability into the operation of actor 306 for future reference and analysis. In particular, the actor output table 930 supports examination into why certain inputs and outputs were selected from actor table 310 and used during the operation of the actor 306 over time.

The sensor output table 910 captures a historical record of the real-world values 320 received by sensor 302, the input correlithm object output by the sensor 302, and the timestamps associated with the mapping of real-world values 320 to input correlithm objects by sensor 302. The node output table 920 captures a historical record of the source correlithm objects determined by node 304, the target correlithm objects output by the node 304, the timestamps associated with the mapping of source correlithm objects with target correlithm objects by node 304, and the n-dimensional distance calculations (e.g., Hamming distances) associated with the operation of nodes 304. The actor output table 930 captures a historical record of the output correlithm objects determined by actor 306, the real-world values 326 output by actor 306, the timestamps associated with the mapping of output correlithm objects to real-world values 326 by actor 306, and the n-dimensional distance calculations (e.g., Hamming distances) associated with the operation of actors 306. These historical records can be individually or collectively retrieved and communicated in response to one or more requests in order to perform an audit or other function. For example, where system 900 is used in an artificial intelligence engine of an autonomous vehicle that gets into an accident, the data from one or more of sensor output table 910, node output table 920, and actor output table 930 may be used to examine the decision-making that was made by the autonomous vehicle leading to the accident. The contents of tables 910, 920, and 930 may be periodically stored in remote memory devices for long-term storage and retrieval.

Figure 10:
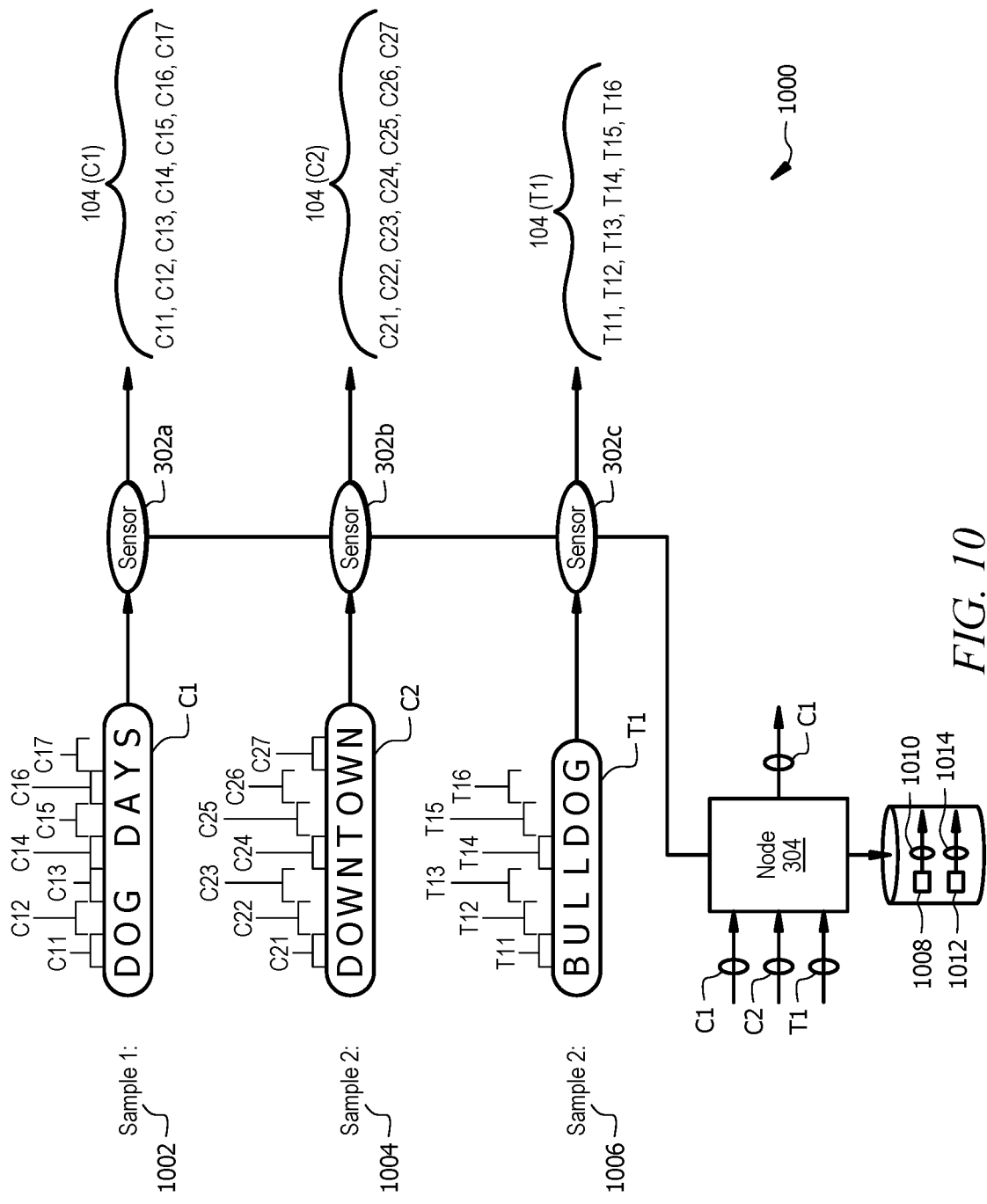
FIG. 10 illustrates an embodiment of a correlithm object processing system that implements coding.

FIG. 10 is a schematic view of an embodiment of a correlithm object processing system 1000 that is implemented by a user device 100 to perform operations using correlithm objects 104. System 1000 and its constituent components can be implemented by processor 502, one or more of the engines 510, 512, and 514, and other elements of computer architecture 500, described above with respect to FIG. 5. System 1000 includes sensors 302a, 302b, and 302c communicatively coupled to node 304. System 1000 may be configured with any suitable number and/or configuration of sensors 302 and nodes 304 to achieve an appropriate scale for the operation to be performed. In one embodiment, sensors 302a, 302b, 302c, and node 304 may all be implemented on the same device (e.g. user device 100). In other embodiments, sensors 302a, 302b, 302c, and node 304 may each be implemented on different devices in signal communication with each other, for example over a network. In other embodiments, different devices may be configured to implement any combination of sensors 302a, 302b, 302c, and node 304.

In general, sensors 302a-c serve as interfaces that allow a user device 100 to convert real-world data samples into correlithm objects 104 that can be used in the correlithm object domain. Sensors 302a-b are configured to receive sample text strings as real-world values and to determine one or more correlithm objects 104 based on these values. Sensor 302c is configured to receive a test text string as real-world values and to determine one or more correlithm objects 104 based on these values. Node 304 is configured to receive the correlithm objects 104 output by sensors 302a-c, determine which sample text string is the closest match, in n-dimensional space, to the test text string, and output a correlithm object representing the determined sample text string.

In operation, sensor 302a receives a first sample text string 1002 including a plurality of characters. In the example illustrated in FIG. 10, the first sample text string 1002 is "DOG DAYS". Sensor 302a assigns correlithm objects 104 to subsets of the characters of the first sample text string 1002. For example, sensor 302a assigns a first correlithm object C11 to the first two characters of the string 1002: "DO"; a second correlithm object C12 to the second and third characters of the string 1002: "OG"; a third correlithm object C13 to the third and fourth characters of the string 1002: "G_"; a fourth correlithm object C14 to the fourth and fifth characters of the string 1002: "_D"; a fifth correlithm object C15 to the fifth and sixth characters of the string 1002: "DA"; a sixth correlithm object C16 to the sixth and seventh characters of the string 1002: "AY"; and a seventh correlithm object C17 to the seventh and eighth characters of the string 1002: "YS". The entirety of the string 1002 may be represented by an eighth correlithm object C1. In this way, sensor 302a represents the real-world value of "DOG DAYS" according to pairwise combinations of characters progressing and overlapping from the beginning of the string to the end of the string 1002. As will be described below, this allows for a more granular and accurate comparison with the test text string 1006. Although sensor 302a is described above with respect to generating correlithm objects C11-C17 according to a successive and overlapping pairwise subset of characters from string 1002, the correlithm objects 104 generated by sensor 302a from first sample text string 1002 may be any number and combination of characters from the string 1002 to suit particular needs.

Sensor 302b receives a second sample text string 1004 including a plurality of characters. In the example illustrated in FIG. 10, the second sample text string 1004 is "DOWNTOWN". Sensor 302b assigns correlithm objects 104 to subsets of the characters of the second sample text string 1004. For example, sensor 302b assigns a first correlithm object C21 to the first two characters of the string 1004: "DO"; a second correlithm object C22 to the second and third characters of the string 1004: "OW"; a third correlithm object C23 to the third and fourth characters of the string 1004: "WN"; a fourth correlithm object C24 to the fourth and fifth characters of the string 1004: "NT"; a fifth correlithm object C25 to the fifth and sixth characters of the string 1004: "TO"; a sixth correlithm object C26 to the sixth and seventh characters of the string 1004: "OW"; and a seventh correlithm object C27 to the seventh and eighth characters of the string 1004: "WN". The entirety of the string 1004 may be represented by an eighth correlithm object C2. In this way, sensor 302b represents the real-world value of "DOWNTOWN" according to pairwise combinations of characters progressing and overlapping from the beginning of the string to the end of the string 1004. As will be described below, this allows for a more granular and accurate comparison with the test text string 1006. Although sensor 302b is described above with respect to generating correlithm objects C21-C27 according to a successive and overlapping pairwise subset of characters from string 1004, the correlithm objects 104 generated by sensor 302b from second sample text string 1004 may be any number and combination of characters from the string 1004 to suit particular needs.

Sensor 302c receives a test text string 1006 including a plurality of characters. As will be described in greater detail below, node 304 will determine which of the first sample text string 1002 and second sample text string 1004 are the closest match to the test text string 1006 in n-dimensional space using correlithm objects 104. In the example illustrated in FIG. 10, the test text string 1006 is "BULLDOG." Sensor 302c assigns correlithm objects 104 to subsets of the characters of the test text string 1006. For example, sensor 302c assigns a first correlithm object T11 to the first two characters of the string 1006: "BU"; a second correlithm object T12 to the second and third characters of the string 1006: "UL"; a third correlithm object T13 to the third and fourth characters of the string 1006: "LL"; a fourth correlithm object T14 to the fourth and fifth characters of the string 1006: "LD"; a fifth correlithm object T15 to the fifth and sixth characters of the string 1006: "DO"; and a sixth correlithm object T16 to the sixth and seventh characters of the string 1006: "OG". The entirety of the string 1006 may be represented by a seventh correlithm object T1. In this way, sensor 302c represents the real-world value of "BULLDOG" according to pairwise combinations of characters progressing and overlapping from the beginning of the string to the end of the string 1006. As will be described below, this allows for a more granular and accurate comparison between test text string 1006 and first and second sample text strings 1002 and 1004. Although sensor 302c is described above with respect to generating correlithm objects T11-T16 according to a successive and overlapping pairwise subset of characters from string 1006, the correlithm objects 104 generated by sensor 302c from test text string 1006 may be any number and combination of characters from the string 1006 to suit particular needs.

Node 304 receives correlithm objects C1, C2, and T1 from sensors 302a, 302b, and 302c, respectively. In general, node 304 determines the n-dimensional distances between each of the correlithm objects T11-T16 of test text string 1006 against each of the correlithm objects C11-C17 associated with first sample text string 1002 and stores it in distance table 1008, an example of which is illustrated in more detail in FIG. 11A. Node 304 determines a first composite value 1010 of the distances calculated and stored in distance table 1008. Node 304 determines the n-dimensional distances between each of the correlithm objects T11-T16 of test text string 1006 against each of the correlithm objects C21-C27 associated with second sample text string 1004 and stores it in distance table 1012, an example of which is illustrated in more detail in FIG. 11B. Node 304 determines a second composite value 1014 of the distances calculated and stored in distance table 1012. Node 304 determines which of first sample text string 1002 and second sample text string 1004 is the closest match to test text string 1006 based on a comparison of composite values 1010 and 1014, as described in greater detail below.

FIG. 11A illustrates one embodiment of a distance table 1008 stored in memory 504 that is used by node 304 to compare the correlithm objects C11-C17 of first sample text string 1002 with the correlithm objects T11-T16 of test text string 1006 in n-dimensional space 102. Such a comparison can be used to determine how closely any portion of the first sample text string 1002 matches the test text string 1006. In operation, node 304 compares each correlithm object T11-T16 pairwise against each correlithm object C11-C17, and determines Hamming distances (or anti-Hamming distances in an alternative embodiment) based on this pairwise comparison. As described above with regard to FIG. 1, the Hamming distance (or anti-Hamming distance) calculation can be used to determine the similarity between correlithm objects T11-T16 and correlithm objects C11-C17. The average number of bits between a random correlithm object and a particular correlithm object is equal to $$\frac{n}{2}$$

(also referred to as standard distance), where 'n' is the number of dimensions in the n-dimensional space 102. The standard deviation is equal to $$\sqrt{\frac{n}{4}},$$

where 'n' is the number of dimensional in the n-dimensional space 102. Thus, if a correlithm object C11-C17 is statistically dissimilar to a corresponding correlithm object T11-T16, then the Hamming distance is expected to be roughly equal to the standard distance. Therefore, if the n-dimensional space 102 is 64-bits, then the anti-Hamming distance between two dissimilar correlithm objects is expected to be roughly 32 bits. If a correlithm object C11-C17 is statistically similar to a corresponding correlithm object T11-T16, then the Hamming distance is expected to be roughly equal to six standard deviations less than the standard distance. Therefore, if the n-dimensional space 102 is 64-bits, then the Hamming distance between similar correlithm objects is expected to be eight or less (i.e., 32 (standard distance)−24 (six standard deviations)=8). In other embodiments, if the Hamming distance is equal to four or five standard deviations less than the standard distance, then the correlithm objects are determined to be statistically similar. The use of six standard deviations away from the standard distance to determine statistical similarity is also appropriate in a larger n-dimensional space 102, such as an n-space of 256-bits.

Node 304 determines the Hamming distances between correlithm object T11 and each of correlithm objects C11-C17 and stores those values in a column of distance table 1008 labeled "T11". Node 304 determines the Hamming distances between correlithm object T12 and each of correlithm objects C11-C17 and stores those values in a column of distance table 1008 labeled "T12". Node 304 repeats this pairwise determination of Hamming distances between correlithm objects T13-T16 and each of correlithm objects C11-C17, and stores those values in columns of table 1008 labeled "T13", "T14", "T15", and "T16", respectively. The Hamming distance values represented in the cells of table 1008 indicate which correlithm objects T11-T16 of test text string 1006 are statistically similar to which correlithm objects C11-C17 of first sample text string 1002. Cells of table 1008 having a Hamming distance value of zero in them, for example, indicate a similarity. Cells of table 1008 with an "SD" in them (for standard distance), for example, indicate a dissimilarity. In table 1008, for example, the cell indicating the Hamming distance value of zero between correlithm object T15 (representing the characters "DO") and correlithm object C11 (representing characters "DO") indicates that there is a statistical similarity ("DO" is a match with "DO"). Similarly, the cell indicating the Hamming distance value of zero between correlithm object T16 (representing the characters "OG") and correlithm object C12 (representing characters "OG") indicates that there is a statistical similarity ("OG" is a match with "OG"). The combination of these comparisons between successive correlithm objects (T15-T16 and C11-C12) also indicates that the combination of the characters represented by those correlithm objects are statistically similar ("DOG" is a match with "DOG"). The Hamming distances represented by the cells of table 1008 can be added together to form an aggregate Hamming distance 1010 (e.g., aggregate Hamming distance calculation of 1280 for table 1008). The smaller the aggregate Hamming distance calculation, the closer the statistical similarity between correlithm objects T11-16 and correlithm objects C11-C17. By representing subsets of characters in text strings in n-dimensional space using correlithm objects and then comparing those correlithm to each other as described above with respect to table 1008, system 1000 can find statistical similarities among text strings.

FIG. 11B illustrates one embodiment of a distance table 1012 stored in memory 504 that is used by node 304 to compare the correlithm objects C21-C27 of second sample text string 1004 with the correlithm objects T11-T16 of test text string 1006 in n-dimensional space 102. Such a comparison can be used to determine how closely any portion of the second sample text string 1004 matches the test text string 1006. In operation, node 304 compares each correlithm object T11-T16 pairwise against each correlithm object C21-C27, and determines Hamming distances (or anti-Hamming distances in an alternative embodiment) based on this pairwise comparison. As described above, if a correlithm object C21-C27 is statistically dissimilar to a corresponding correlithm object T11-T16, then the Hamming distance is expected to be roughly equal to the standard distance. If a correlithm object C21-C27 is statistically similar to a corresponding correlithm object T11-T16, then the Hamming distance is expected to be roughly equal to the six standard deviations less than the standard distance (e.g., Hamming distance of eight for 64-bit n-dimensional space 102).

Node 304 determines the Hamming distances between correlithm object T11 and each of correlithm objects C21-C27 and stores those values in a column of distance table 1012 labeled "T11". Node 304 determines the Hamming distances between correlithm object T12 and each of correlithm objects C21-C27 and stores those values in a column of distance table 1012 labeled "T12". Node 304 repeats this pairwise determination of Hamming distances between correlithm objects T13-T16 and each of correlithm objects C21-C27, and stores those values in columns of table 1008 labeled "T13", "T14", "T15", and "T16", respectively. The Hamming distance values represented in the cells of table 1008 indicate which correlithm objects T11-T16 of test text string 1006 are statistically similar to which correlithm objects C21-C27 of second sample text string 1004. Cells of table 1012 having a Hamming distance value of zero in them, for example, indicate a similarity. Cells of table 1012 with an "SD" in them (for standard distance), for example, indicate a dissimilarity. In table 1012, for example, the cell indicating the Hamming distance value of zero between correlithm object T15 (representing the characters "DO") and correlithm object C21 (representing characters "DO") indicates that there is a statistical similarity ("DO" is a match with "DO"). Unlike with correlithm objects C11-C17 representing first sample text string 1002, none of the other correlithm objects T11-T16 are statistically similar to any other correlithm objects C21-C27. The Hamming distances represented by the cells of table 1012 can be added together to form an aggregate Hamming distance 1014 (e.g., aggregate Hamming distance calculation of 1312 for table 1012). The smaller the aggregate Hamming distance calculation, the closer the statistical similarity between correlithm objects T11-16 and correlithm objects C21-C27. By representing subsets of characters in text strings in n-dimensional space using correlithm objects and then comparing those correlithm to each other as described above with respect to table 1012, system 1000 can find statistical similarities among text strings.

Node 304 compares the aggregate Hamming distance 1010 of table 1008 (e.g., 1280) with the aggregate Hamming distance 1014 of table 1012 (e.g., 1312) to determine which is smaller to indicate which of the first sample text string 1002 or the second sample text string 1004 is more statistically similar to the test text string 1006. In this example, because the aggregate Hamming distance 1010 associated with first sample text string 1002 is smaller than the aggregate Hamming distance 1014 associated with the second sample text string 1004, node 304 determines that first sample text string 1002 is a closer match to test text string 1006 than second sample text string 1004. This result is supported by the fact that first sample text string 1002 and test text string 1006 have common characters that spell "DOG" whereas the second sample text string 1004 and test text string 1006 only have common characters that spell "DO". Accordingly, node 304 outputs a correlithm object C1 representing the first sample text string 1002.

Figure 12:
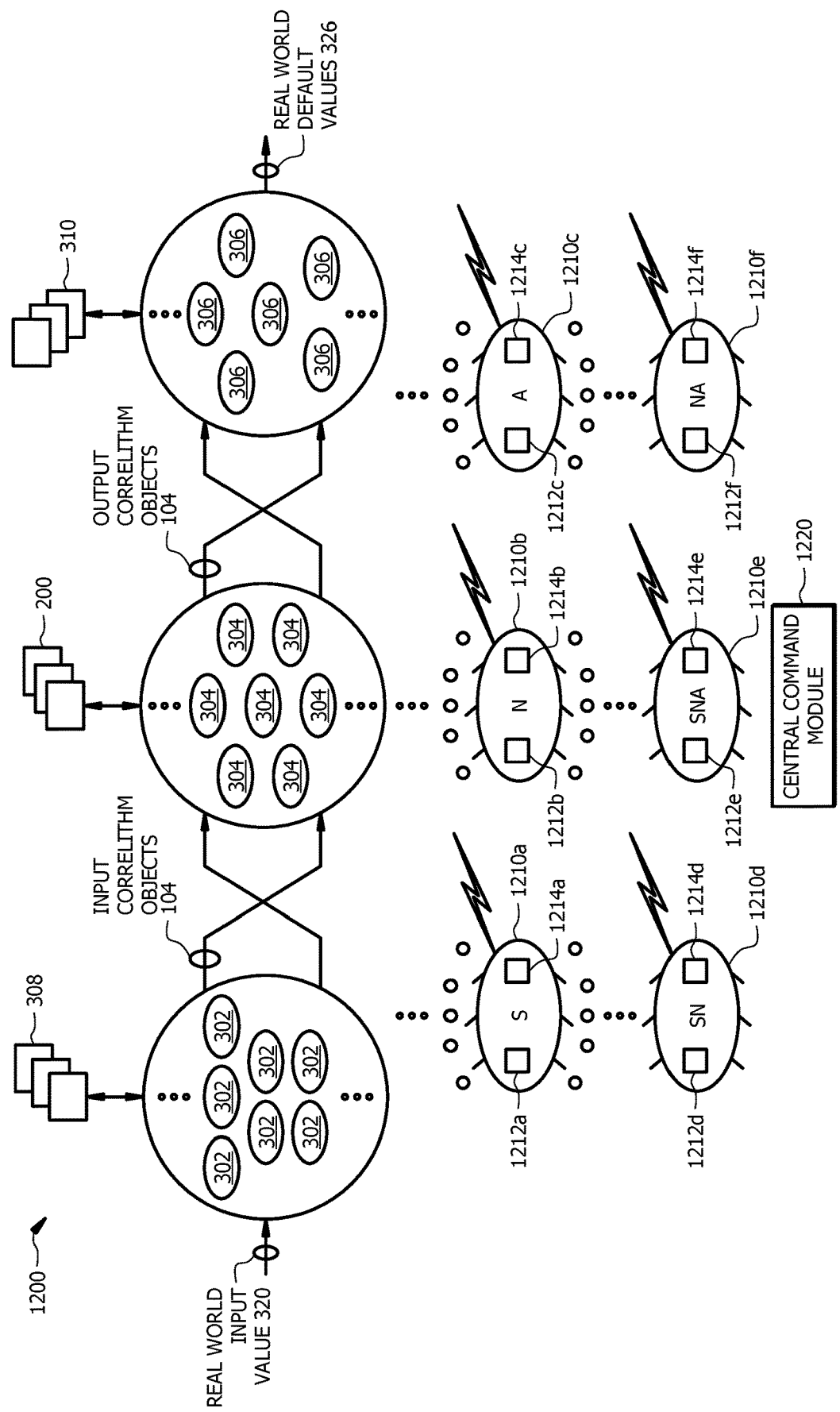
FIG. 12 illustrates an embodiment of a correlithm object processing system that uses mobile correlithm object devices.

FIG. 12 is a schematic view of an embodiment of a correlithm object processing system 1200 that is implemented by a user device 100 to perform operations using correlithm objects 104. The system 1200 is a variation of the system 300 illustrated in FIG. 3 and can be implemented by processor 502, one or more engines 510, 512, and 514, and other elements of computer architecture 500, described above with respect to FIG. 5. As with system 300, system 1200 may be configured with any suitable number and/or configuration of sensors 302, nodes 304, and actors 306. As illustrated in FIG. 12, a collection of sensors 302 may be communicatively coupled to a collection of nodes 304, which may be further communicatively coupled to a collection of actors 306. The collection of sensors 302 have access to one or more sensor tables 308 to perform various functions associated with mapping real-world input values 320 to input correlithm objects 104, among others, as described above with respect to FIGS. 1-11. The collection of nodes 304 have access to one or more node tables 200 to perform various functions associated with mapping input correlithm objects 104 to output correlithm objects 104, among others, as described above with respect to FIGS. 1-11. The collection of actors 306 have access to one or more actor tables 310 to perform various functions associated with mapping output correlithm objects 104 to real-world output values 326, among others, as described above with respect to FIGS. 1-11.

System 1200 illustrated in FIG. 12 adds mobility and collective processing to the sensors 302, nodes 304, and actors 306, as described in greater detail below. In particular, system 1200 includes any suitable number and combination of mobile correlithm object devices 1210 (e.g., mobile correlithm object devices 1210a-f described below) that each comprise correlithm object "parts" such as sensors 302, nodes 304, and/or actors 306, or higher-level aggregates of such parts, where such aggregates fulfill higher-level correlithm object functions (e.g., such as language or facial recognition or robotic control, among others). A mobile correlithm object device 1210 can be implemented by processor 502, one or more engines 510, 512, and 514, and other elements of computer architecture 500, described above with respect to FIG. 5.

Each mobile correlithm object device 1210 functions as a single organism while maintaining continuous or periodic communication with the other elements of system 1200 as a whole. In various embodiments, the mobile correlithm object devices 1210 may communicate with each other, using light signals, audio signals, radio frequency signals, all or a portion of a telecommunications network (e.g., Internet), or using any other suitable communications technique applicable to computer or networking systems. System 1200 further includes a central command module 1220 that communicates with and functions as an executive director for an affiliated group of mobile correlithm object devices 1210. Processor 502 of computer architecture 500 is configured to implement central command module 1220.

A mobile correlithm object device 1210 has the ability to communicate with other mobile correlithm object devices 1210. In one embodiment, a group of mobile correlithm object devices 1210 are affiliated with one another by being assigned common tasks to perform. In another embodiment, a group of mobile correlithm object devices 1210 are unaffiliated with one another by being assigned different tasks to perform. A mobile correlithm object device 1210 has the ability to communicate with other mobile correlithm object devices 1210 whether they are affiliated or unaffiliated. Each mobile correlithm object device 1210 has sufficient intelligence and functionality to perform individual tasks as a part of a collective function performed by its affiliated group of mobile correlithm object devices 1210. For example, a collection of mobile correlithm object devices 1210 can collectively implement some or all portions of a computer program in a computer system. The collective intelligence and functionality of the mobile correlithm object devices 1210 and their associated central command module 1220 is distributed across the entire aggregate system 1200 and all or most of its components. One common term for this kind of organization is "swarm intelligence" which is a collective behavior of decentralized, self-organized components.

FIG. 12 illustrates example mobile correlithm object devices 1210*a-f* which are now described herein. A mobile correlithm object device 1210*a* may embody a sensor 302 (indicated by "S") from the collection of sensors 302 illustrated in FIG. 12. This means that device 1210*a* can perform at least the functionalities of a sensor 302, as described above. Device 1210*a* includes an address 1212*a* and a destination table 1214*a*. The address 1212*a* is any suitable logical or physical identifier for device 1210*a*, such as a network address, a MAC address, an IP address, a computer address, or any other suitable communications address. Destination table 1214*a* is a physical or logical data structure that identifies other mobile correlithm objects 1210 with which to connect and communicate information, and their respective addresses 1214. Although only a single mobile correlithm object device 1210*a* is prominently illustrated and described in FIG. 12, system 1200 can include and deploy any suitable number and combination of mobile correlithm object devices 1210*a*.

In another example, mobile correlithm object device 1210*b* may embody a node 304 (indicated by "N") from the collection of nodes 304 illustrated in FIG. 12. This means that device 1210*b* can perform at least the functionalities of a node 304, as described above. Device 1210*b* includes an address 1212*b* and a destination table 1214*b* which are similar to address 1212*a* and destination table 1212*a* but are specific to mobile correlithm object device 1210*b*. Although only a single mobile correlithm object device 1210*b* is prominently illustrated and described in FIG. 12, system 1200 can include and deploy any suitable number and combination of mobile correlithm object devices 1210*b*.

In still another example, mobile correlithm object device 1210*c* may embody an actor 306 (indicated by "A") from the collection of actors 306 illustrated in FIG. 12. This means that device 1210*c* can perform at least the functionalities of an actor 306, as described above. Device 1210*c* includes an address 1212*c* and a destination table 1214*c* which are similar to address 1212*a* and destination table 1212*a* but are specific to mobile correlithm object device 1210*c*. Although only a single mobile correlithm object device 1210*c* is prominently illustrated and described in FIG. 12, system 1200 can include and deploy any suitable number and combination of mobile correlithm object devices 1210*c*.

Particular mobile correlithm objects 1210 may embody a combination of sensors 302, nodes 304, and actors 306. For example, mobile correlithm object device 1210*d* may embody each of a sensor 302 and node 304 (indicated by "SN") from the collection of sensors 302 and nodes 304 illustrated in FIG. 12. This means that device 1210*d* can perform the functionalities of at least both sensors 302 and nodes 304, as described above. Device 1210*d* includes an address 1212*d* and a destination table 1214*d* which are similar to address 1212*a* and destination table 1212*a* but are specific to mobile correlithm object device 1210*d*. Although only a single mobile correlithm object device 1210*d* is prominently illustrated and described in FIG. 12, system 1200 can include and deploy any suitable number and combination of mobile correlithm object devices 1210*d*.

In another example, mobile correlithm object device 1210*e* may embody each of a sensor 302, node 304, and an actor 306 (indicated by "SNA") from the collection of sensors 302, nodes 304, and actors 306 illustrated in FIG. 12. This means that device 1210*e* can perform the functionalities of at least each of sensors 302, nodes 304, and actors 306, as described above. Device 1210*e* includes an address 1212*e* and a destination table 1214*e* which are similar to address 1212*a* and destination table 1212*a* but are specific to mobile correlithm object device 1210*e*. Although only a single mobile correlithm object device 1210*e* is prominently illustrated and described in FIG. 12, system 1200 can include and deploy any suitable number and combination of mobile correlithm object devices 1210*e*.

In still another example, mobile correlithm object device 1210*f* may embody each of a node 304 and an actor 306 (indicated by "NA") from the collection of nodes 304 and actors 306 illustrated in FIG. 12. This means that device 1210*f* can perform the functionalities of at least both of nodes 304 and actors 306, as described above. Device 1210*f* includes an address 1212*f* and a destination table 1214*f* which are similar to address 1212*a* and destination table 1212*a* but are specific to mobile correlithm object device 1210*f*. Although only a single mobile correlithm object device 1210*f* is prominently illustrated and described in FIG. 12, system 1200 can include and deploy any suitable number and combination of mobile correlithm object devices 1210*f*.

In some embodiments, one or more of devices 1210 are mobile in some capacity such as, for example, physically, logically, or otherwise. In this context, mobility may be reflected as physical separation and deployment away from the other elements of system 1200, including central command module 1220. Therefore, in a collective system 1200, the mobile correlithm object devices 1210 can be deployed across a logical or physical space instead of or in addition to being located as a single, local computational module. One beneficial environment for mobile correlithm object devices 1210 to be deployed is the Internet. For example, correlithm object based mobile devices embodying sensors, nodes, and/or actors could be distributed across the Internet, with components lying in different machines, servers, physical or logical robots, or other suitable constructs. Another beneficial environment for mobile correlithm object devices 1210 to be deployed is within different elements of a computer system. Such deployment of mobile correlithm object devices 1210 may provide technical advantages in the form of significant and robust resistance to physical damage to any host system because the elements of system 1200, in this case, would not necessarily reside in only one specific locality.

Mobility may also be reflected as logical separation. The mobile correlithm object devices 1210 could be dispersed across a network, so that its functionalities are ubiquitous. Such mobile correlithm object devices 1210 could be shifted from logical host system 1200 to another logical host system 1200 piecemeal, with each mobile correlithm object device 1210 itself remaining functionally intact and able to communicate effectively with other mobile correlithm object devices 1210, as appropriate.

The design and implementation of individual mobile correlithm object devices 1210 could range across a spectrum from individual components to complex subsystems akin to "lobes," which are higher-level aggregate functionalities and functional units of correlithm object systems. This approach could accomplish several technical advantages. For example, a physical machine might have a correlithm object-based intelligence that is in fact a subordinate component of the collective functionality, with enough logically local functionality to deal with specific local situations. Such an architecture would minimize response and reflex time. The actions of an individual machine would be communicated to a general central correlithm object system, such as central command module 1220, for further evaluation and direction. Each mobile correlithm object device 1210 could be designed to meet a specific purpose. These purposes span many dimensions, such as, for example, mobility choices (e.g., where and how to move next), action choices (e.g., "fight or flee"), coordination choices (e.g., if, and how best to cooperate and support nearby groupings of mobile correlithm object devices 1210), communications choices (e.g., how much and what to pass on to a central correlithm object system or other mobile correlithm object devices 1210), and others.

One embodiment of these mobile correlithm object devices 1210 is "containerized" mobile correlithm object devices 1210. In this embodiment, each mobile correlithm object device 1210, or perhaps a collection of them, and other components or even the entire central correlithm object system 1200 (as is appropriate for the task at hand) are logically placed into a "container." In this context, a container is an operating system feature in which the kernel allows the existence of multiple isolated user-space instances. A containerized environment, such as this, is good for the distribution of the mobile correlithm object devices 1210 across a network in any suitable manner for the task at hand. In this way, mobile correlithm object devices 1210 that embody one or more of sensors 302, nodes 304, and actors 306 can be deployed across a network.

System 1200 that deploys mobile correlithm object devices 1210 as described above add redundancy and security against the damage or loss of any given mobile device 1210. In some embodiments, a subset of mobile correlithm objects 1210 are deployed temporarily, akin to sending out a scouting party of mobile devices 1210 instead of individual mobile devices 1210. Furthermore, system 1200 facilitates reproduction of the entire system 1200 or particular parts of it (e.g., particular mobile devices 1210) to add to the robustness of the system 1200. System 1200 similarly provides techniques for growth of the correlithm object system or its component parts at any level from simple individual mobile correlithm object devices 1210, to more complex mobile correlithm object devices 1210, to a central correlithm object system itself, by adding parts to the system according to several strategies (cloning, adding virgin (untrained) parts, generating new virgin parts, etc.).

In operation, one or more mobile correlithm object devices 1210, such as any number and combination of mobile correlithm object devices 1210a-f, are deployed to different parts of a network or system to perform particular assigned tasks. Each of the deployed mobile correlithm object devices 1210 perform one or more of the functionalities of a sensor 302, node 304, and/or actor 306, as described above with respect to FIGS. 1-11. In one embodiment, one or more of the deployed mobile correlithm object devices 1210 communicate with one another using, for example, their assigned addresses 1212 and destination tables 1214. In another embodiment, one or more of the deployed mobile correlithm object devices 1210 communicate with other nearby deployed mobile correlithm object devices 1210 regardless of their destination tables 1214. Mobile correlithm object devices 1210 periodically report back to and take instruction from central command module 1220 to coordinate their functionality, deployment, and other activities.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A correlithm object processing system, comprising:
a memory configured to store a reference table that includes a plurality of correlithm objects that each comprises a point in an n-dimensional space represented by a binary string;
a first node implemented by a first hardware processor and configured to transmit a particular one of the plurality of correlithm objects to a demultiplexer;
the demultiplexer communicatively coupled to the first node and configured to split the particular one of the plurality of correlithm objects into a first portion of the binary string and a second portion of the binary string;
a multiplexer communicatively coupled to the demultiplexer by at least a first communication channel and a second communication channel, the multiplexer configured to receive the first portion of the particular correlithm object over the first communication channel associated with a first noise level, to receive the second portion of the particular correlithm object over the second communication channel associated with a second noise level that is lower than the first noise level, and to combine the first and second portions into a received correlithm object;
a second node implemented by a second hardware processor and communicatively coupled to the multiplexer and configured to:
determine distances between the received correlithm object and each of the plurality of correlithm objects stored in the reference table, wherein the distance between the received correlithm object and each of the plurality of correlithm objects is determined based on differences between a binary string representing the particular correlithm object and binary strings representing each of the plurality of correlithm objects;
identify one of the plurality of correlithm objects from the reference table with the shortest distance; and
output the identified correlithm object.

2. The system of claim 1, wherein:
the demultiplexer is further configured to split the particular correlithm object into a third portion of the binary string;
the multiplexer is communicatively coupled to the demultiplexer by a third communication channel associated with a third noise level and is further configured to receive the third portion over the third communication channel and to combine the third portion with the first and second portions to form the received correlithm object.

3. The system of claim 2, wherein the third communication channel fails and, in response, the multiplexer combines the first and second portions with a series of random bits to form the received correlithm object.

4. The system of claim 1, wherein the first node is configured to access the reference table.

5. The system of claim 1, wherein determining distances comprises determining a Hamming distance between the received correlithm object and each of the correlithm objects in the reference table.

6. The system of claim 1, wherein determining distances comprises determining an anti-Hamming distance between the received correlithm object and each of the correlithm objects in the reference table.

7. The system of claim 1, wherein the first and second communication channels comprise separate paths on a circuit chip.

8. A method, comprising:
storing a plurality of correlithm objects in a reference table of a memory, wherein each of the plurality of correlithm objects comprises a point in an n-dimensional space represented by a binary string;
transmitting a particular one of the plurality of correlithm objects from a first node implemented by a first hardware processor to a demultiplexer;
splitting, by the demultiplexer, the particular one of the plurality of correlithm objects into a first portion of the binary string and a second portion of the binary string;
receiving, by a multiplexer, the first portion of the particular correlithm object over a first communication channel associated with a first noise level;
receiving, by the multiplexer, the second portion of the particular correlithm object over a second communication channel associated with a second noise level that is lower than the first noise level;
combining, by the multiplexer, the first and second portions into a received correlithm object;
determining, by a second node implemented by a second hardware processor, distances between the received correlithm object and each of the plurality of correlithm objects stored in the reference table, wherein the distance between the received correlithm object and each of the plurality of correlithm objects is determined based on differences between a binary string representing the particular correlithm object and binary strings representing each of the plurality of correlithm objects;
identifying, by the second node, one of the plurality of correlithm objects from the reference table with the shortest distance; and
outputting, by the second node, the identified correlithm object.

9. The method of claim 8, further comprising:
splitting the particular correlithm object into a third portion of the binary string;
receiving the third portion over a third communication channel associated with a third noise level; and
combining the third portion with the first and second portions to form the received correlithm object.

10. The method of claim 9, wherein the third communication channel fails and, in response, the method further comprising combining the first and second portions with a series of random bits to form the received correlithm object.

11. The method of claim 8, wherein determining distances comprises determining a Hamming distance between the received correlithm object and each of the correlithm objects in the reference table.

12. The method of claim 8, wherein determining distances comprises determining an anti-Hamming distance between the received correlithm object and each of the correlithm objects in the reference table.

13. The method of claim 8, wherein the first and second communication channels comprise separate paths on a circuit chip.

14. A computer program product comprising executable instructions stored in a non-transitory computer readable medium such that when executed by one or more processors causes the one or more processors to:
store a plurality of correlithm objects in a reference table of a memory, wherein each of the plurality of correlithm objects comprises a point in an n-dimensional space represented by a binary string;
transmit a particular one of the plurality of correlithm objects from a first node implemented by a first hardware processor to a demultiplexer;
split, by the demultiplexer, a particular one of the plurality of correlithm objects into a first portion of the binary string and a second portion of the binary string;
receive, by a multiplexer, the first portion of the particular correlithm object over a first communication channel associated with a first noise level;
receive, by the multiplexer, the second portion of the particular correlithm object over a second communication channel associated with a second noise level that is lower than the first noise level;
combine, by the multiplexer, the first and second portions into a received correlithm object;
determine, by a second node implemented by a second hardware processor, distances between the received correlithm object and each of the plurality of correlithm objects stored in the reference table, wherein the distance between the received correlithm object and each of the plurality of correlithm objects is determined based on differences between a binary string representing the particular correlithm object and binary strings representing each of the plurality of correlithm objects;
identify, by the second node, one of the plurality of correlithm objects from the reference table with the shortest distance; and
output, by the second node, the identified correlithm object.

15. The computer program product of claim 14, further configured to:
split the particular correlithm object into a third portion of the binary string;
receive the third portion over a third communication channel associated with a third noise level; and combine the third portion with the first and second portions to form the received correlithm object.

16. The computer program product of claim 15, wherein the third communication channel fails and, in response, the computer program product further configured to combine the first and second portions with a series of random bits to form the received correlithm object.

17. The computer program product of claim 14, wherein determining distances comprises determining a Hamming distance between the received correlithm object and each of the correlithm objects in the reference table.

18. The computer program product of claim 14, wherein determining distances comprises determining an anti-Hamming distance between the received correlithm object and each of the correlithm objects in the reference table.

19. The computer program product of claim 14, wherein the first and second communication channels comprise separate paths on a circuit chip.

\* \* \* \* \*